(12) United States Patent
Zhang et al.

(10) Patent No.: US 12,493,375 B2
(45) Date of Patent: Dec. 9, 2025

(54) CONTROL METHOD, STYLUS, AND TOUCH SYSTEM

(71) Applicant: Honor Device Co., Ltd., Shenzhen (CN)

(72) Inventors: Wei Zhang, Shenzhen (CN); Beihang Zhang, Shenzhen (CN); Hang Li, Shenzhen (CN)

(73) Assignee: HONOR DEVICE CO. LTD., Shenzhen (CN)

( * ) Notice: Subject to any disclaimer, the term of this patent is extended or adjusted under 35 U.S.C. 154(b) by 0 days.

(21) Appl. No.: 18/708,358

(22) PCT Filed: Jan. 10, 2023

(86) PCT No.: PCT/CN2023/071552
§ 371 (c)(1),
(2) Date: May 8, 2024

(87) PCT Pub. No.: WO2023/185210
PCT Pub. Date: Oct. 5, 2023

(65) Prior Publication Data
US 2025/0004586 A1   Jan. 2, 2025

(30) Foreign Application Priority Data

Mar. 29, 2022   (CN) .......................... 202210317608.1

(51) Int. Cl.
*G06F 3/041*      (2006.01)
*G06F 3/0354*     (2013.01)
*G06F 3/038*      (2013.01)

(52) U.S. Cl.
CPC ...... *G06F 3/04162* (2019.05); *G06F 3/03545* (2013.01); *G06F 3/0383* (2013.01); *G06F 2203/0384* (2013.01)

(58) Field of Classification Search
CPC .... G06F 3/03545; G06F 3/038; G06F 3/0383; G06F 3/04162; G06F 3/0418;
(Continued)

(56) References Cited

U.S. PATENT DOCUMENTS 9,176,630 B2    11/2015  Westhues et al.
2016/0041635 A1  2/2016  Michihata et al.
(Continued)

FOREIGN PATENT DOCUMENTS

CN    103238129 A    8/2013
CN    105955515 A    9/2016
(Continued)

*Primary Examiner* — Nelson M Rosario
(74) *Attorney, Agent, or Firm* — Conley Rose, P.C.

(57) ABSTRACT

A control method, a stylus, and a touch system. When a stylus is in a working mode, based on status information of an $N^{th}$ frame of an uplink signal, a target receiving channel is controlled to be turned on in a preset manner to receive an $(N+1)^{th}$ frame of the uplink signal sent by an electronic device based on the target receiving channel, where the target receiving channel includes a first receiving channel formed between a first electrode and a control module, and/or a second receiving channel formed between a second electrode and the control module. Therefore, when an uplink signal received by the second electrode is interfered with, an uplink signal can also be normally received to be successfully decoded within a periodicity in which the first electrode works alone.

20 Claims, 13 Drawing Sheets

(58) Field of Classification Search
CPC ................. G06F 3/0441; G06F 3/0442; G06F 2203/0384; Y02D 30/70
See application file for complete search history.

(56) References Cited

U.S. PATENT DOCUMENTS

| | | | |
|---|---|---|---|
| 2022/0043553 A1 | | 2/2022 | Liang et al. |
| 2022/0334701 A1* | | 10/2022 | Cheng ................... G06F 3/0441 |
| 2023/0259221 A1 | | 8/2023 | Conghua et al. |

FOREIGN PATENT DOCUMENTS

| | | | |
|---|---|---|---|
| CN | 107204786 | A | 9/2017 |
| CN | 110308807 | A | 10/2019 |
| CN | 111045555 | A | 4/2020 |
| CN | 211787016 | U | 10/2020 |
| CN | 112214118 | A | 1/2021 |
| CN | 213934829 | U | 8/2021 |
| CN | 114911364 | A | 8/2022 |

* cited by examiner

CONTROL METHOD, STYLUS, AND TOUCH SYSTEM

CROSS-REFERENCE TO RELATED APPLICATIONS

This is a U.S. National Stage of International Application No. PCT/CN2023/071552 filed on Jan. 10, 2023, which claims priority to Chinese Patent Application No. 202210317608.1, filed with the China National Intellectual Property Administration on Mar. 29, 2022, both of which are incorporated herein by reference in their entireties.

TECHNICAL FIELD

Embodiments of this application relate to the field of electronic technologies, and in particular, to a control method, a stylus, and a touch system.

BACKGROUND

With the development of science and technologies, an electronic device such as a tablet computer is equipped with a stylus. The stylus is used to perform touch or writing on the electronic device, so that the electronic device performs a corresponding function.

Currently, the electronic device may send an uplink signal to the stylus, and the stylus decodes the uplink signal, and sends a downlink signal to the electronic device based on a decoded uplink signal, to achieve signal synchronization between the electronic device and the stylus.

However, when the stylus is used to perform a touch or writing operation on the electronic device, problems such as the stylus being unable to discharge ink, writing disconnection, and latency may occur.

SUMMARY

Embodiments of this application provide a control method, a stylus, and a touch system, to alleviate problems caused by interference in electrodes, such as the stylus being unable to discharge ink, writing disconnection, and latency, thereby greatly improving writing experience.

According to a first aspect, an embodiment of this application provides a control method, applied to a stylus, where the stylus includes a first electrode, a second electrode, and a control module, a first receiving channel is formed between the first electrode and the control module, and a second receiving channel is formed between the second electrode and the control module; and the control method includes: obtaining, by the control module when the stylus is in a working mode, an $N^{th}$ frame of uplink signal sent by an electronic device; and controlling, by the control module based on status information of the $N^{th}$ frame of uplink signal, a target receiving channel to be turned on in a preset manner, to receive an $(N+1)^{th}$ frame of uplink signal sent by the electronic device based on the target receiving channel, where the target receiving channel includes the first receiving channel and/or the second receiving channel.

In this way, when an uplink signal received by the second electrode is interfered with, an uplink signal can also be normally received to be successfully decoded within a periodicity in which the first electrode works alone, to alleviate problems caused by interference, such as the stylus being unable to discharge ink, writing disconnection, and latency, thereby greatly improving writing experience.

In a possible implementation, the status information of the $N^{th}$ frame of uplink signal includes channel configuration information of the target receiving channel for receiving the $N^{th}$ frame of uplink signal and a decoding result of the $N^{th}$ frame of uplink signal, where the decoding result is that decoding fails or the decoding succeeds.

In a possible implementation, the controlling, by the control module based on status information of the $N^{th}$ frame of uplink signal, a target receiving channel to be turned on in a preset manner includes: continuously controlling, by the control module if the decoding result of the $N^{th}$ frame of uplink signal is that the decoding succeeds and the channel configuration information is that a first target receiving channel is turned on, the first target receiving channel to be turned on, where the first target receiving channel is a first preset channel or a second preset channel; and the first preset channel includes the first receiving channel and the second receiving channel, and the second preset channel includes the first receiving channel. In this way, when the stylus is in the working mode, it may be determined whether to switch a target receiving channel for receiving a current frame of uplink signal based on a decoding result of a previous frame of uplink signal; and if the decoding result of the previous frame of uplink signal is that decoding succeeds, the target receiving channel for receiving the current frame of uplink signal is not switched, so that a decoding success rate of the current frame of uplink signal received through the target receiving channel is improved.

In a possible implementation, the controlling, by the control module based on status information of the $N^{th}$ frame of uplink signal, a target receiving channel to be turned on in a preset manner includes: switching, by the control module if the decoding result of the $N^{th}$ frame of uplink signal is that the decoding fails and the channel configuration information is that a first target receiving channel is turned on, the first target receiving channel being turned on to a second target receiving channel being turned on, where one of the first target receiving channel and the second target receiving channel is a first preset channel, and an other is a second preset channel; and the first preset channel includes the first receiving channel and the second receiving channel, and the second preset channel includes the first receiving channel. In this way, if the decoding result of the previous frame of uplink signal is that the decoding fails, the target receiving channel for receiving the current frame of uplink signal is switched. Therefore, when the decoding fails because an uplink signal received by the second electrode is interfered with, the target receiving channel that is turned on can be switched, so that an uplink signal can also be normally received to be successfully decoded within a periodicity in which the first electrode works alone, to alleviate problems caused by interference, such as the stylus being unable to discharge ink, writing disconnection, and latency, thereby greatly improving writing experience.

In a possible implementation, the status information of the $N^{th}$ frame of uplink signal includes channel configuration information of the target receiving channel for receiving the $N^{th}$ frame of uplink signal.

In a possible implementation, the controlling, by the control module based on status information of the $N^{th}$ frame of uplink signal, a target receiving channel to be turned on in a preset manner includes: cyclically controlling, by the control module, on or off of the first receiving channel and the second receiving channel based on the channel configuration information corresponding to the $N^{th}$ frame of uplink signal and a first preset sequence. In this way, uplink signals are received in a polling manner by cyclically switching different electrodes. Therefore, when an uplink signal received by the second electrode is interfered with, an uplink signal can also be normally received to be successfully decoded within a periodicity in which the first electrode works alone, to alleviate problems caused by interference, such as the stylus being unable to discharge ink, writing disconnection, and latency, thereby greatly improving writing experience.

In a possible implementation, the first preset sequence includes that a first preset channel and a second preset channel are alternately turned on, where the channel configuration information corresponding to the $N^{th}$ frame of uplink signal is that the first preset channel is turned on or the second preset channel is turned on; and the first preset channel includes the first receiving channel and the second receiving channel, and the second preset channel includes the first receiving channel. In this way, uplink signals are received in a polling manner by cyclically switching different electrodes, so that the uplink signals received by the control module are from the first electrode alone, or from the first electrode and the second electrode. Therefore, when an uplink signal received by the second electrode is interfered with, an uplink signal can also be normally received to be successfully decoded within a periodicity in which the first electrode works alone, to alleviate problems caused by interference, such as the stylus being unable to discharge ink, writing disconnection, and latency, thereby greatly improving writing experience.

In a possible implementation, the first preset sequence includes that a first preset channel being turned on, the first preset channel being turned on, and a second preset channel being turned on are cyclically controlled, where the channel configuration information corresponding to the $N^{th}$ frame of uplink signal is that the first preset channel is turned on or the second preset channel is turned on; and the first preset channel includes the first receiving channel and the second receiving channel, and the second preset channel includes the first receiving channel. In this way, uplink signals are received in a polling manner by cyclically switching different electrodes, so that the uplink signals received by the control module are from the first electrode alone, or from the first electrode and the second electrode. Therefore, when an uplink signal received by the second electrode is interfered with, an uplink signal can also be normally received to be successfully decoded within a periodicity in which the first electrode works alone, to alleviate problems caused by interference, such as the stylus being unable to discharge ink, writing disconnection, and latency, thereby greatly improving writing experience.

In a possible implementation, the first preset sequence includes that a first preset channel being turned on, a second preset channel being turned on, and a third preset channel being turned on are cyclically controlled, where the channel configuration information corresponding to the $N^{th}$ frame of uplink signal is one of that the first preset channel is turned on, that the second preset channel is turned on, and that the third preset channel is turned on; and the first preset channel includes the first receiving channel and the second receiving channel, the second preset channel includes the first receiving channel, and the third preset channel includes the second receiving channel. In this way, uplink signals are received in a polling manner by cyclically switching different electrodes, so that the uplink signals received by the control module are from the first electrode alone, or from the second electrode alone, or from the first electrode and the second electrode. Therefore, when an uplink signal received by the second electrode is interfered with, an uplink signal can also be normally received to be successfully decoded within a periodicity in which the first electrode works alone; or when an uplink signal received by the first electrode is interfered with, an uplink signal can also be normally received to be successfully decoded within a periodicity in which the second electrode works alone, to alleviate problems caused by interference, such as the stylus being unable to discharge ink, writing disconnection, and latency, thereby greatly improving writing experience.

In a possible implementation, after the obtaining, by the control module, an $N^{th}$ frame of uplink signal sent by an electronic device, the method further includes: decoding, by the control module, the $N^{th}$ frame of uplink signal; and controlling, by the control module if the decoding result of the $N^{th}$ frame of uplink signal is that the decoding succeeds, the first electrode and/or the second electrode to send a downlink signal based on the decoded $N^{th}$ frame of uplink signal; or determining, by the control module if the decoding result of the $N^{th}$ frame of uplink signal is that the decoding fails, whether a successfully decoded target uplink signal exists in M frames of uplink signals before the $N^{th}$ frame of uplink signal, where M is a positive integer; and controlling, by the control module if a successfully decoded target uplink signal exists, the first electrode and/or the second electrode to send a downlink signal based on the target uplink signal. In this way, when the decoding of the $N^{th}$ frame of uplink signal fails, a control unit can still continuously control the first electrode and the second electrode to send the downlink signal based on the successfully decoded target uplink signal. In this way, the electronic device can sample each downlink signal sent by the stylus, and can obtain a touch position of the stylus on a touch screen, an inclination angle of the stylus, and the like once based on each downlink signal, to achieve synchronization between the electronic device and the stylus, thereby further alleviating the problems caused by the interference, such as the stylus being unable to discharge ink, the writing disconnection, and the latency.

In a possible implementation, the controlling, by the control module if a successfully decoded target uplink signal exists, the first electrode and/or the second electrode to send a downlink signal based on the target uplink signal includes: controlling, by the control module if a plurality of successfully decoded target uplink signals exist, the first electrode and/or the second electrode to send the downlink signal based on a target uplink signal closest to the $N^{th}$ frame of uplink signal. In this way, when the decoding of the $N^{th}$ frame of uplink signal fails, the target uplink signal with a closest time interval to the $N^{th}$ frame of uplink signal is selected to control the first electrode and the second electrode to send the downlink signal. In this way, a time sequence in which the stylus sends downlink signals can be synchronized with a time sequence in which the electronic device samples the downlink signals, so that the electronic device can normally sample the downlink signals sent by the stylus, thereby further alleviating the problems caused by the interference, such as the stylus being unable to discharge ink, the writing disconnection, and the latency.

In a possible implementation, the stylus further includes a first switch and a second switch, the first switch is connected between the first electrode and the control module, and the second switch is connected between the second electrode and the control module; and the controlling, by the control module based on status information of the $N^{th}$ frame of uplink signal, a target receiving channel to be turned on in a preset manner includes: controlling, by the control module based on the status information of the $N^{th}$ frame of uplink signal, on or off of the first switch and the second switch in the preset manner, to control on or off of the first receiving channel and the second receiving channel.

In a possible implementation, the method further includes: cyclically controlling, by the control module when the stylus is in an idle mode, on or off of the first receiving channel and the second receiving channel based on a second preset sequence, where the second preset sequence is that both the first receiving channel and the second receiving channel are turned off, both the first receiving channel and the second receiving channel are turned on, both the first receiving channel and the second receiving channel are turned off, and the first receiving channel is turned on and the second receiving channel is turned off. In this way, it is set that both the first receiving channel and the second receiving channel are turned off within a part of duration in the idle mode, thereby reducing power consumption of the stylus in the idle mode. In addition, when a receiving channel is turned on in the idle mode, the first receiving channel and the second receiving channel can be turned on within a part of time, and the first receiving channel can be turned on within another part of time. Therefore, when an uplink signal received by the second electrode is interfered with, an uplink signal can also be normally received to be successfully decoded within a periodicity in which the first electrode works alone, so that the stylus is switched to the working mode.

In a possible implementation, the method further includes: controlling, by the control module if the control module successfully decodes a received uplink signal for the first time when the stylus is in the idle mode, the stylus to be switched from the idle mode to the working mode.

In a possible implementation, the method further includes: controlling, by the control module if the control module unsuccessfully decodes all received uplink signals within preset duration or does not receive any uplink signal within the preset duration when the stylus is in the working mode, the stylus to be switched from the working mode to the idle mode. In this way, if a decoding unit unsuccessfully decodes all the received uplink signals within the preset duration or does not receive any uplink signal within the preset duration, it may be considered that a user has moved a pen tip of the stylus to a position far away from a touch screen of the electronic device. Therefore, the stylus may be switched from the working mode to the idle mode, thereby reducing power consumption of the stylus.

According to a second aspect, an embodiment of this application provides a stylus, including a memory and a processor, where the memory is configured to store a computer program, and the processor is configured to invoke the computer program, to perform the foregoing control method.

According to a third aspect, an embodiment of this application further provides a computer-readable storage medium, storing a computer program or instructions, the computer program or the instructions, when being run, implementing the foregoing control method.

According to a fourth aspect, an embodiment of this application provides a touch system, including an electronic device and the foregoing stylus, where the electronic device is configured to send an uplink signal to the stylus, and receive a downlink signal sent by the stylus.

Effects of various possible implementations of the second aspect to the fourth aspect are similar to those of the first aspect and possible designs of the first aspect. Details are not described herein again.

DESCRIPTION OF EMBODIMENTS

Figure 1:
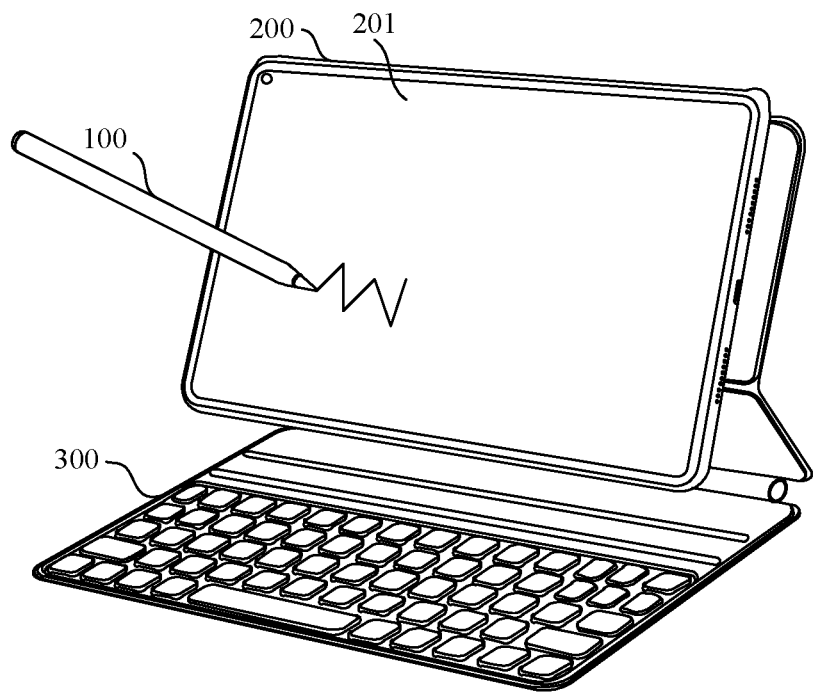
FIG. 1 is a schematic diagram of a scenario to which embodiments of this application are applicable.

FIG. 1 is a schematic diagram of a scenario to which embodiments of this application are applicable. Refer to FIG. 1. The scenario includes a stylus (stylus) 100, an electronic device 200, and a wireless keyboard 300. In FIG. 1, an example in which the electronic device 200 is a tablet computer (tablet) is used for description. The stylus 100 and the wireless keyboard 300 may provide an input to the electronic device 200, and the electronic device 200 performs an operation in response to the input based on the input of the stylus 100 or the wireless keyboard 300. A touch region may be arranged on the wireless keyboard 300. The stylus pen 100 may operate the touch region of the wireless keyboard 300, to provide an input to the wireless keyboard 300. The wireless keyboard 300 may perform an operation in response to the input based on the input of the stylus 100. In an embodiment, the stylus 100 and the electronic device 200, the stylus 100 and the wireless keyboard 300, and the electronic device 200 and the wireless keyboard 300 can be interconnected through a communication network, to achieve interaction of wireless signals. The communication network may be but is not limited to: a short-distance communication network such as a WI-FI hotspot network, a WI-FI peer-to-peer (peer-to-peer, P2P) network, a Bluetooth network, a zigbee network, or a near field communication (near field communication, NFC) network.

The stylus 100 may be a capacitive stylus. The capacitive stylus may include a passive capacitive stylus and an active capacitive stylus. The passive capacitive stylus may be referred to as a passive capacitive stylus, and the active capacitive stylus may be referred to as an active capacitive stylus.

One or more electrodes may be arranged in the active capacitive stylus (for example, a pen tip), and the active capacitive stylus may transmit a signal through the electrode. When the stylus 100 is the active capacitive stylus, an electrode array is required to be integrated on a touch screen 201 of the electronic device 200 that performs interaction with the stylus 100. In an embodiment, the electrode array may be a capacitive electrode array. The electronic device 200 may receive a signal from the active capacitive stylus through the electrode array, and then recognize, when receiving the signal, a position of the active capacitive stylus on the touch screen and an inclination angle of the active capacitive stylus based on a change of a capacitance value on the touch screen 201.

Figure 2:
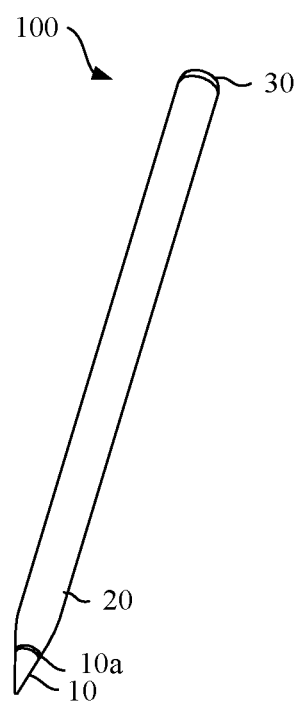
FIG. 2 is a schematic diagram of a structure of a stylus according to an embodiment of this application.

FIG. 2 is a schematic diagram of a structure of a stylus according to an embodiment of this application. As shown in FIG. 2, the stylus 100 may include a pen tip 10, a pen barrel 20, and a rear cover 30. The interior of the pen barrel 20 is of a hollow structure. The pen tip 10 and the rear cover 30 are respectively located at two ends of the pen barrel 20. The rear cover 30 and the pen barrel 20 may be connected by plugging or snapping. For details of a matching relationship between the pen tip 10 and the pen barrel 20, refer to description in FIG. 3.

Figure 3:
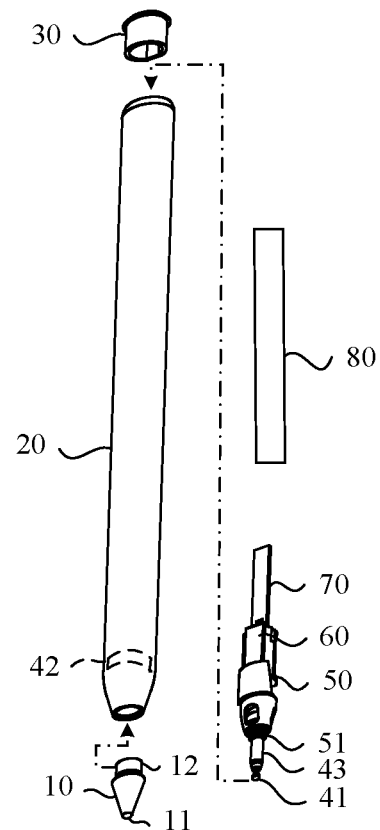
FIG. 3 is a schematic diagram of a partially disassembled structure of a stylus according to an embodiment of this application.

FIG. 3 is a schematic diagram of a partially disassembled structure of a stylus according to an embodiment of this application. As shown in FIG. 3, the stylus 100 further includes a main shaft assembly 50. The main shaft assembly 50 is located in the pen barrel 20, and the main shaft assembly 50 is slidably arranged in the pen barrel 20. The main shaft assembly 50 is provided with an external thread 51, and the pen tip 10 includes a writing end 11 and a connecting end 12, where the connecting end 12 of the pen tip 10 is provided with an internal thread (not shown) that matches the external thread 51.

When the main shaft assembly 50 is assembled into the pen barrel 20, the connecting end 12 of the pen tip 10 extends into the pen barrel 20 and is threadedly connected to the external thread 51 of the main shaft assembly 50. In some examples, the connecting end 12 of the pen tip 10 is also connected to the main shaft assembly 50 in a detachable manner such as snapping. By the detachable connection between the connecting end 12 of the pen tip 10 and the main shaft assembly 50, the pen tip 10 can be changed.

To detect pressure on the writing end 11 of the pen tip 10, as shown in FIG. 2, there is a gap 10a between the pen tip 10 and the pen barrel 20. In this way, when the writing end 11 of the pen tip 10 is subjected to external force, the pen tip 10 can move towards the pen barrel 20, and the movement of the pen tip 10 drives the main shaft assembly 50 to move within the pen barrel 20. For detection for the external force, as shown in FIG. 3, a pressure-sensitive assembly 60 is arranged on the main shaft assembly 50, a part of the pressure-sensing assembly 60 is fixedly connected to a fixed structure in the pen barrel 20, and a part of the pressure-sensing assembly 60 is fixedly connected to the main shaft assembly 50. In this way, when the main shaft assembly 50 moves with the pen tip 10, because the part of the pressure-sensitive assembly 60 is fixedly connected to the fixed structure in the pen barrel 20, the movement of the main shaft assembly 50 drives the pressure-sensitive assembly 60 to deform. The deformation of the pressure-sensitive assembly 60 is transmitted to a circuit board 70 (for example, the pressure-sensitive component 60 and the circuit board 70 may be electrically connected through a wire or a flexible circuit board), and the circuit board 70 detects the pressure of the writing end 11 of the pen tip 10 based on the deformation of the pressure-sensitive component 60, to control a line thickness of the writing end 11 based on the pressure of the writing end 11 of the pen tip 10.

It should be noted that, the detection for the pressure of the pen tip 10 includes but is not limited to the foregoing method. For example, a pressure sensor may also be arranged in the writing end 11 of the pen tip 10, so that the pressure sensor detects the pressure of the pen tip 10.

In this embodiment, as shown in FIG. 3, the stylus 100 further includes a plurality of electrodes, and the plurality of electrodes may be, for example, a first emitter electrode 41, a grounding electrode 43, and a second emitter electrode 42. The first emitter electrode 41, the grounding electrode 43, and the second emitter electrode 42 each are electrically connected to the circuit board 70. The first emitter electrode 41 may be located in the pen tip 10 and close to the writing end 11, and the circuit board 70 may be configured as a control board that may provide signals to the first emitter electrode 41 and the second emitter electrode 42 respectively. The first emitter electrode 41 is configured to emit a first signal, and when the first emitter electrode 41 is close to the touch screen 201 of the electronic device 200, coupling capacitance may be formed between the first emitter electrode 41 and the touch screen 201 of the electronic device 200, so that the electronic device 200 can receive the first signal. The second emitter electrode 42 is configured to emit a second signal, and the electronic device 200 may determine an inclination angle of the stylus 100 based on the received second signal. In this embodiment of this application, the second emitter electrode 42 may be located on an inner wall of the pen barrel 20. In an example, the second emitter electrode 42 may also be located on the main shaft assembly 50.

The grounding electrode 43 may be located between the first emitter electrode 41 and the second emitter electrode 42, or the grounding electrode 43 may be located on peripheries of the first emitter electrode 41 and the second emitter electrode 42. The grounding electrode 43 is configured to reduce coupling between the first emitter electrode 41 and the second emitter electrode 42.

When the electronic device 200 receives the first signal from the stylus 100, a capacitance value at a corresponding position on the touch screen 201 changes. Therefore, the electronic device 200 may determine, based on the change of the capacitance value on the touch screen 201, a position of the stylus 100 (or the pen tip of the stylus 100) on the touch screen 201. In addition, the electronic device 200 may obtain the inclination angle of the stylus 100 by using a dual-pen tip projection method in an inclination angle detection algorithm. Positions of the first emitter electrode 41 and the second emitter electrode 42 in the stylus 100 are different. Therefore, when the electronic device 200 receives the first signal and the second signal from the stylus 100, capacitance values at two positions on the touch screen 201 change. The electronic device 200 may obtain the inclination angle of the stylus 100 based on a distance between the first emitter electrode 41 and the second emitter electrode 42 and a distance between the two positions at which the capacitance values change on the touch screen 201. For more details of obtaining the inclination angle of the stylus 100, refer to related description of the dual-pen tip projection method in conventional technologies.

In this embodiment of this application, as shown in FIG. 3, the stylus 100 further includes a battery assembly 80, where the battery assembly 80 is configured to supply power to the circuit board 70. The battery assembly 80 may include a lithium-ion battery, or the battery assembly 80 may include a nickel-chromium battery, an alkaline battery, a nickel-metal hydride battery, or the like. In an embodiment, a battery included in the battery assembly 80 may be a rechargeable battery or a disposable battery. When the battery included in the battery assembly 80 is the rechargeable battery, the stylus 100 may charge the battery assembly 80 in a wireless charging manner.

Figure 4:
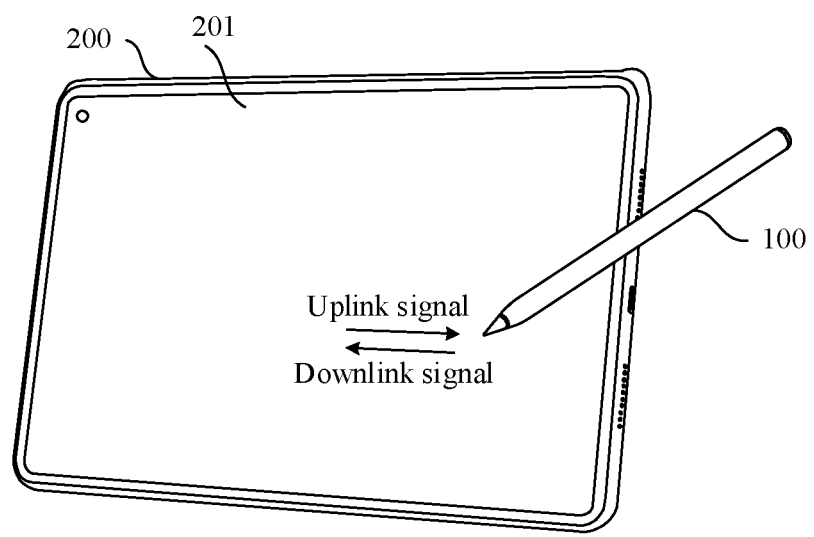
FIG. 4 is a schematic diagram of interaction between a stylus and an electronic device according to an embodiment of this application.

When the stylus 100 is the active capacitive stylus, as shown in FIG. 4, after the electronic device 200 and the stylus 100 are connected in a wireless manner, the electronic device 200 may send an uplink signal to the stylus 100 through the electrode array integrated on the touch screen 201. The stylus 100 may receive the uplink signal through a receiving electrode, and the stylus 100 emits a downlink signal through an emitter electrode (for example, the first emitter electrode 41 and the second emitter electrode 42). The downlink signal includes the foregoing first signal and second signal. When the pen tip 10 of the stylus pen 100 comes into contact with the touch screen 201, a capacitance value at a corresponding position on the touch screen 201 changes. The electronic device 200 may determine, based on the capacitance value on the touch screen 201, the position of the pen tip 10 of the stylus 100 on the touch screen 201. In an embodiment, the uplink signal and the downlink signal may be square wave signals.

Figure 5:
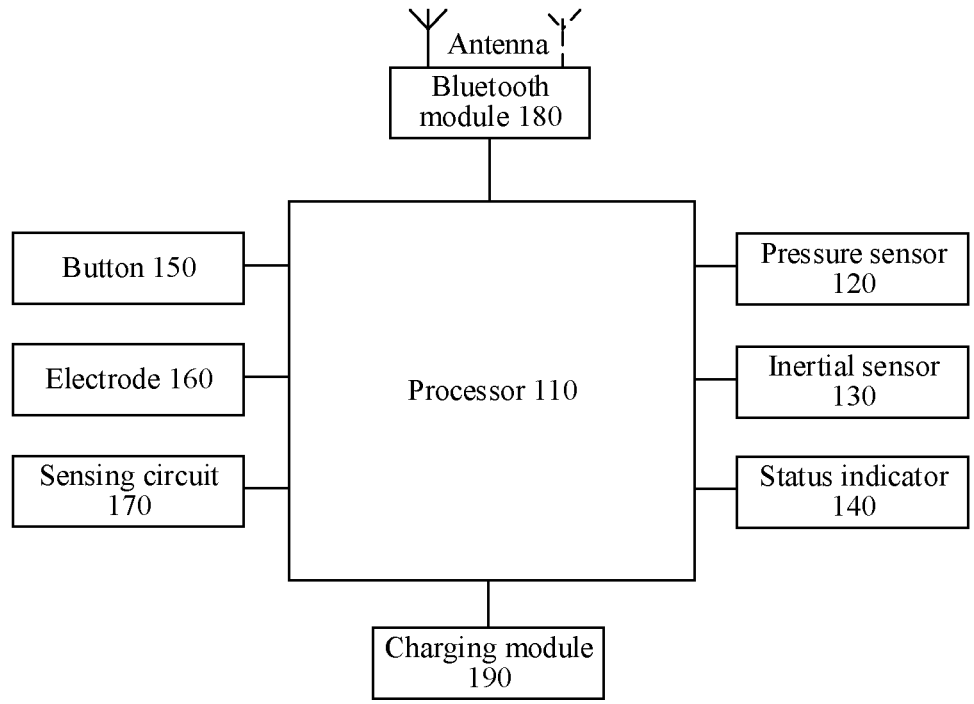
FIG. 5 is a schematic diagram of a hardware structure of a stylus according to an embodiment of this application.

FIG. 5 is a schematic diagram of a hardware structure of a stylus according to an embodiment of this application. As shown in FIG. 5, the stylus 100 may include a processor 110. The processor 110 may include a storage and a processing circuit for supporting operations of the stylus 100. The storage and the processing circuit may include storage apparatuses such as a non-volatile memory (for example, a flash memory or another electrically programmable read-only memory configured as a solid-state drive), and a volatile memory (for example, a static or dynamic random access memory). The processing circuit in the processor 110 may be configured to control the operations of the stylus 100. The processing circuit may be based on one or more microprocessors, a microcontroller, a digital signal processor, a baseband processor, a power management unit, an audio chip, an application specific integrated circuit, and the like.

The stylus 100 may include one or more sensors. For example, the sensor may include a pressure sensor 120. The pressure sensor 120 may be arranged in the writing end 11 of the stylus 100 (as shown in FIG. 3). Certainly, the pressure sensor 120 may also be arranged in the pen barrel 20 of the stylus 100. In this way, after one end of the pen tip 10 of the stylus 100 is subjected to force, the other end of the pen tip 10 moves to apply the force to the pressure sensor 120. In an embodiment, the processor 110 may adjust a line thickness of the pen tip 10 of the stylus 100 when writing based on pressure detected by the pressure sensor 120.

The sensor may also include an inertial sensor 130. The inertial sensor 130 may include a three-axis accelerometer and a three-axis gyroscope, and/or other components for measuring movement of the stylus 100. For example, a three-axis magnetometer may be included in the sensor through a configuration of a nine-axis inertial sensor. The sensor may also include additional sensors such as a temperature sensor, an ambient light sensor, a light-based proximity sensor, a contact sensor, a magnetic sensor, a pressure sensor, and/or another sensor.

The stylus 100 may include a status indicator 140 such as a light-emitting diode, and a button 150. The status indicator 140 is configured to prompt a user of a status of the stylus 100. The button 150 may include a mechanical button and a non-mechanical button, and the button 150 may be configured to collect button press information from the user.

In this embodiment of this application, the stylus 100 may include one or more electrodes 160 (for details, refer to description in FIG. 3), where one electrode 160 may be located at the writing end of the stylus 100, and one electrode 160 may be located in the pen tip 10. Refer to the foregoing related description.

The stylus 100 may include a sensing circuit 170. The sensing circuit 170 may sense capacitive coupling between the electrode 160 and a drive line of a capacitive touch sensor panel that performs interaction with the stylus 100. The sensing circuit 170 may include an amplifier configured to receive a capacitance reading from the capacitive touch sensor panel, a clock configured to generate a demodulation signal, a phase shifter configured to generate a phase-shifted demodulation signal, a mixer configured to demodulate the capacitance reading by using an in-phase demodulation frequency component, a mixer configured to demodulate the capacitance reading by using a quadrature demodulation frequency component, and the like. A demodulation result of the mixer may be for determining amplitude proportional to capacitance, so that the stylus 100 can sense contact with the capacitive touch sensor panel.

It may be understood that, according to actual requirements, the stylus 100 may include a microphone, a speaker, an audio generator, a vibrator, a camera, a data port, and other devices. The user may use the devices to providing commands, to control operations of the stylus 100 and the electronic device 200 that performs interaction with the stylus 100, and receive status information and other outputs.

The processor 110 may be configured to run software that controls operations of the stylus 100 on the stylus 100. During operation of the stylus 100, the software run on the processor 110 may process a sensor input, a button input, and inputs from other apparatuses, to monitor movement of the stylus 100 and other user inputs. The software run on the processor 110 may detect a user command and may communicate with the electronic device 200.

To support wireless communication between the stylus 100 and the electronic device 200, the stylus 100 may include a wireless module. In FIG. 5, an example in which the wireless module is a Bluetooth module 180 is used for description. The wireless module may also be a WI-FI hotspot module, WI-FI point-to-point module, or the like. The Bluetooth module 180 may include a radio frequency transceiver, such as a transceiver. The Bluetooth module 180 may also include one or more antennas. The transceiver may use the antenna to emit and/or receive a wireless signal. Based on a type of the wireless module, the wireless signal may be a Bluetooth signal, a wireless local area network signal, a remote signal such as a cellular phone signal, a near field communication signal, or another wireless signal.

The stylus 100 may also include a charging module 190, where the charging module 190 may support charging of the stylus 100 and supply power to the stylus 100.

It should be understood that, the electronic device 200 in this embodiment of this application may be referred to as a user device (user equipment, UE), a terminal (terminal), or the like. For example, the electronic device 200 may be a mobile terminal or a fixed terminal with a touch screen, such as a tablet computer (portable android device, PAD), a personal digital assistant (personal digital assistant, PDA), a handheld device with a wireless communication function, a computing device, an in-vehicle device or a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). A form of the terminal device is not limited in embodiments of this application.

Figure 6:
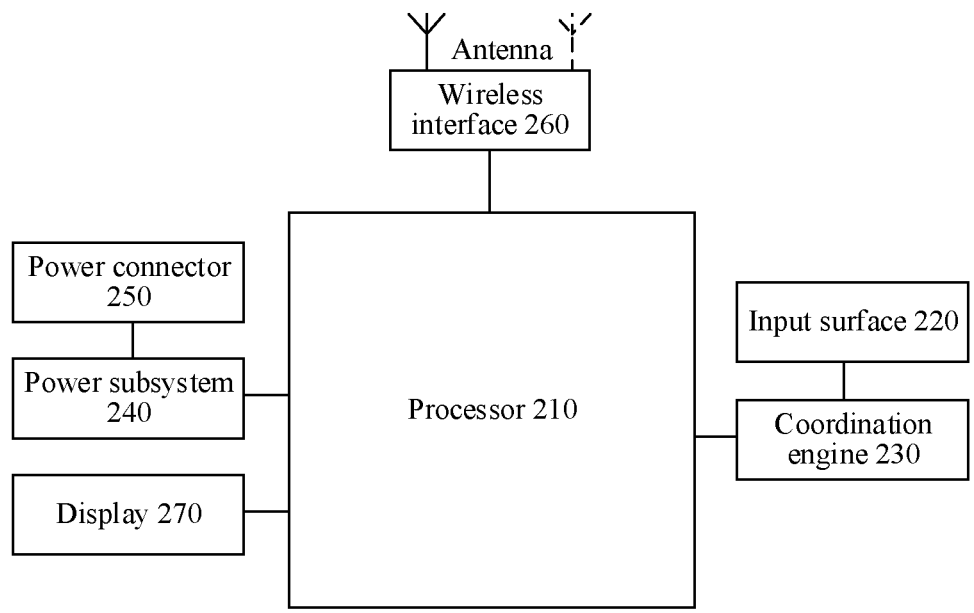
FIG. 6 is a schematic diagram of a hardware structure of an electronic device according to an embodiment of this application.

FIG. 6 is a schematic diagram of a hardware structure of an electronic device according to an embodiment of this application. Refer to FIG. 6. The electronic device 200 may include a plurality of subsystems that cooperate to execute, coordinate, or monitor one or more operations or functions of the electronic device 202. The electronic device 200 includes a processor 210, an input surface 220, a coordination engine 230, a power subsystem 240, a power connector 250, a wireless interface 260, and a display 270.

For example, the coordination engine 230 may be configured to communicate with and/or process data with another subsystem of the electronic device 200; communicate with and/or transact data with the stylus 100; measure and/or obtain an output of one or more analog or digital sensors (such as a touch sensor); measure and/or obtain an output of one or more sensor nodes of a sensor node array (such as an array of capacitive sensing nodes); receive and position a tip signal and a ring signal from the stylus 100; position the stylus 100 based on positions of a tip signal intersection region and a ring signal intersection region; and the like.

The coordination engine 230 of the electronic device 200 includes or is otherwise communicatively coupled to a sensor layer that is located below the input surface 220 or integrated with the input surface. The coordination engine 230 positions the stylus 100 on the input surface 220 by using the sensor layer, and estimates an angular position of the stylus 100 relative to a plane of the input surface 220 by using the technology described in this specification. In an embodiment, the input surface 220 may be referred to as the touch screen 201.

For example, the sensor layer of the coordination engine 230 of the electronic device 200 is capacitive sensing node grids arranged in columns and rows. More specifically, a column trace array is set to be perpendicular to a row trace array. The sensor layer may be separate from other layers of the electronic device, or the sensor layer may be directly arranged above another layer. For example, the other layers are but are not limited to: a display stack layer, a force sensor layer, a digitizer layer, a polarizer layer, a battery layer, a structural or decorative housing layer, and the like.

The sensor layer can be operated in a plurality of modes. If the sensor layer is operated in a mutual capacitance mode, a column trace and a row trace form one capacitive sensing node at each overlap point (for example, "perpendicular" mutual capacitance). If the sensor layer is operated in a self capacitance mode, the column trace and the row trace form two (perpendicularly aligned) capacitive sensing nodes at each overlap point. In another implementation solution, if the sensor layer is operated in the mutual capacitance mode, adjacent column traces and/or adjacent row traces respectively form one capacitive sensing node (for example, "horizontal" mutual capacitance). As described above, the sensor layer may detect existence of the pen tip 10 of the stylus 100 and/or a touch of the user's finger by monitoring a change of capacitance (for example, mutual capacitance or self capacitance) present at each capacitive sensing node. In many cases, the coordination engine 230 may be configured to detect, via capacitive coupling, the tip signal and the ring signal received from the stylus 100 through the sensor layer.

The tip signal and/or the ring signal may include specific information and/or data that may be for causing the electronic device 200 to recognize the stylus 100. Such information is generally referred to as "stylus identity" information in this specification. The information and/or data may be received by the sensor layer, and may be interpreted, decoded, and/or demodulated by the coordination engine 230.

The processor 210 may simultaneously receive inputs from more than one stylus by using the stylus identity information. Specifically, the coordination engine 230 may be configured to transmit, to the processor 210, a position and/or an angular position of each stylus in a plurality of styluses detected by the coordination engine 230. In other cases, the coordination engine 230 may also transmit, to the processor 210, information about relative positions and/or relative angular positions of the plurality of styluses detected by the coordination engine 230. For example, the coordination engine 230 may notify the processor 210 that a detected first stylus is located at a distance from a detected second stylus.

In other cases, the end signal and/or the ring signal may also include specific information and/or data that may be for causing the electronic device 200 to recognize a specific user. Such information is generally referred to as "user identity" information in this specification.

The coordination engine 230 may forward the user identity information (if detected and/or recoverable) to the processor 210. If the user identity information cannot be recovered from the tip signal and/or the ring signal, the coordination engine 230 may optionally indicate to processor 210 that the user identity information is unavailable. The processor 210 can use the user identity information (or absence of the information) in any suitable manner, including but not limited to: accepting or refusing an input from the specific user, allowing or refusing access to a specific function of the electronic device, and the like. The processor 210 may simultaneously receive inputs from more than one user by using the user identity information.

In still other cases, the tip signal and/or the ring signal may include specific information and/or data that may be for causing the electronic device 200 to recognize a setting or a preference of the user or the stylus 100. Such information is generally referred to as "stylus setting" information in this specification.

The coordination engine 230 may forward the stylus setting information (if detected and/or recoverable) to the processor 210. If the stylus setting information cannot be recovered from the tip signal and/or the ring signal, the coordination engine 230 may optionally indicate to processor 210 that the stylus setting information is unavailable. The electronic device 200 can use the stylus setting information (or absence of the information) in any suitable manner, including but not limited to: applying the setting to the electronic device, applying the setting to a program run on the electronic device, changing a line thickness, a color, and a pattern presented by a graphics program of the electronic device, changing a setting of a video game operated on the electronic device, and the like.

Generally, the processor 210 may be configured to execute, coordinate, and/or manage functions of the electronic device 200. Such type of functions may include but are not limited to: communicating with and/or transacting data with other subsystems of the electronic device 200, communicating with and/or transacting data with the stylus 100, performing data communication and/or transacting data through a wireless interface, performing data communication and/or transacting data through a wired interface, facilitating exchange of power through a wireless (for example, inductive or resonant) or wired interface, receiving a position and an angular position of one or more styluses, and the like.

The processor 210 may be implemented as any electronic device that can process, receive, or send data or instructions. For example, the processor may be a microprocessor, a central processing unit, an application specific integrated circuit, a field programmable gate array, a digital signal processor, an analog circuit, a digital circuit, or a combination of such devices. The processor may be a single-threaded or multi-threaded processor. The processor may be a single-core or multi-core processor.

During use, the processor 210 may be configured to access a memory storing instructions. The instructions may be configured to cause the processor to execute, coordinate, or monitor one or more operations or functions of the electronic device 200.

The instructions stored in the memory may be configured to control or coordinate operations of other components of the electronic device 200. For example, the components are but are not limited to: another processor, an analog or digital circuit, a volatile or non-volatile memory module, a display, a speaker, a microphone, a rotary input device, a button or another physical input device, a biometric sensor and/or system, a force or touch input/output component, a communication module (such as a wireless interface and/or a power connector), and/or a tactile or tactile feedback device.

The memory may also store electronic data that can be used by the stylus or the processor. For example, the memory may store electronic data or content (such as media files, documents, and applications), device settings and preferences, timing signals and control signals or data, data structures, or databases for various modules, files or configurations related to detecting the tip signal and/or the ring signal, and the like. The memory may be configured as any type of memory. For example, the memory may be implemented as a random access memory, a read-only memory, a flash memory, a removable memory, another type of storage element, or a combination of such devices.

The electronic device 200 further includes the power subsystem 240. The power subsystem 240 may include a battery or another power supply. The power subsystem 240 may be configured to supply power to the electronic device 200. The power subsystem 240 may be further coupled to the power connector 250. The power connector 250 may be any suitable connector or port that may be configured to receive power from an external power source and/or configured to supply power to an external load. For example, in some implementation solutions, the power connector 250 may be configured to recharge the battery in the power subsystem 240. In another implementation solution, the power connector 250 may be configured to transmit power stored in (or available for) the power subsystem 240 to the stylus 100.

The electronic device 200 further includes the wireless interface 260, to facilitate electronic communication between the electronic device 200 and the stylus 100. In an implementation solution, the electronic device 200 may be configured to communicate with the stylus 100 through a low-energy Bluetooth communication interface or a near field communication interface. In other examples, the communication interface facilitates electronic communication between the electronic device 200 and an external communication network, a device, or a platform.

The wireless interface 260 (regardless of whether the wireless interface 260 is a communication interface between the electronic device 200 and the stylus 100 or another communication interface) may be implemented as one or more wireless interfaces, a Bluetooth interface, a near field communication interface, a magnetic interface, a universal serial bus interface, an inductive interface, a resonant interface, a capacitive coupling interface, a Wi-Fi interface, a TCP/IP interface, a network communication interface, an optical interface, an acoustic interface, or any conventional communication interface.

The electronic device 200 further includes the display 270. The display 270 may be located behind the input surface 220, or may be integrated with the input surface 220. The display 270 may be communicatively coupled to processor 210. The processor 210 may use the display 270 to present information to the user. In many cases, the processor 210 uses the display 270 to present an interface with which the user can perform interaction. In many cases, the user manipulates the stylus 100 to perform interaction with the interface.

It is apparent to those skilled in the art that, some of specific details presented above with respect to the electronic device 200 may not be required to practice the specific described implementation solution or an equivalent thereof. Similarly, another electronic device may include a larger quantity of subsystems, modules, components, and the like. When appropriate, some submodules may be implemented as software or hardware. Therefore, it should be understood that, the foregoing description is not intended to be exhaustive or to limit the present disclosure to precise forms described in this specification. On the contrary, it is apparent to one of ordinary skill in the art that, many modifications and variations are possible according to the foregoing teachings.

In some embodiments, when a user may start a drawing application program or a memo application program on an electronic device, or a global writing function of the electronic device, the user may use a stylus to perform drawing, writing, and other operations on a touch screen of the electronic device. Correspondingly, the electronic device may display handwriting drawn by the stylus.

Figure 7:
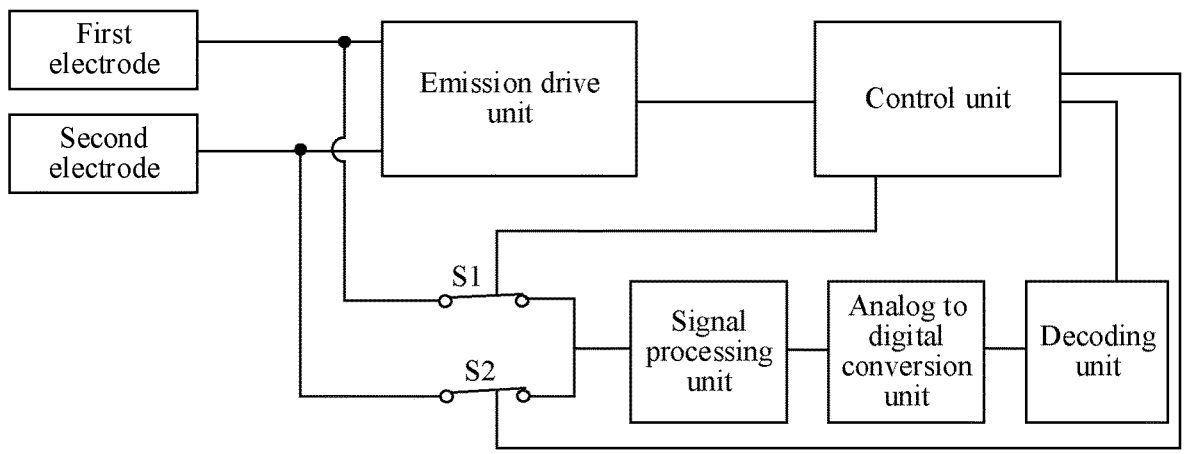
FIG. 7 is a schematic diagram of connection of various hardware structures inside a stylus according to an embodiment of this application.

FIG. 7 is a schematic diagram of connection of various hardware structures inside a stylus according to an embodiment of this application. As shown in FIG. 7, the stylus includes a first electrode, a second electrode, a first switch S1, a second switch S2, a signal processing unit, an analog to digital conversion unit, a decoding unit, a control unit, and an emission drive unit. In addition, a charging module and other devices are further arranged in the stylus.

In this embodiment of this application, an example in which the first electrode is used as both an emitter electrode and a receiving electrode, and the second electrode is used as both an emitter electrode and a receiving electrode is used for description. The first electrode may be the first emitter electrode 41 described in FIG. 3 that is located in a pen tip of the stylus. The second electrode may be the second emitter electrode 42 described in FIG. 3 that is located on an inner wall of the pen barrel 20 or located on the main shaft assembly 50.

When the stylus is used to perform a touch operation on a touch screen of an electronic device, a distance between the first electrode and the touch screen is less than a distance between the second electrode and the touch screen. In addition, a surface area of the first electrode is smaller than a surface area of the second electrode.

The first switch S1 is connected between the first electrode and the signal processing unit, and a control end of the first switch S1 is further connected to the control unit. The first switch S1 is configured to control on or off of a first receiving channel between the first electrode and the signal processing unit under action of the control unit. When the first switch S1 is turned on, the first receiving channel between the first electrode and the signal processing unit is turned on; and when the first switch S1 is turned off, the first receiving channel between the first electrode and the signal processing unit is turned off.

The second switch S2 is connected between the second electrode and the signal processing unit, and a control end of the second switch S2 is further connected to the control unit. The second switch S2 is configured to control on or off of a second receiving channel between the second electrode and the signal processing unit under action of the control unit. When the second switch S2 is turned on, the second receiving channel between the second electrode and the signal processing unit is turned on; and when the second switch S2 is turned off, the second receiving channel between the second electrode and the signal processing unit is turned off.

In some embodiments, the first switch S1 and the second switch S2 may be switching transistors. For example, the first switch S1 may be a first switching transistor, a gate of the first switching transistor is connected to the control unit, a source of the first switching transistor is connected to the first electrode, and a drain of the first switching transistor is connected to the signal processing unit. Correspondingly, the second switch S2 may be a second switching transistor, a gate of the second switching transistor is connected to the control unit, a source of the second switching transistor is connected to the second electrode, and a drain of the second switching transistor is connected to the signal processing unit.

In a case, the first switching transistor may be an N-type transistor. In a scenario, the control unit may input a high level signal to the gate of the first switching transistor, to control the first switching transistor to be turned on, so that the first receiving channel between the first electrode and the signal processing unit is turned on; and in another scenario, the control unit may also input a low level signal to the gate of the first switching transistor, to control the first switching transistor to be turned off (which may also be referred to as cut off), so that the first receiving channel between the first electrode and the signal processing unit is turned off. Correspondingly, the second switching transistor may also be an N-type transistor. In a scenario, the control unit may input a high level signal to the gate of the second switching transistor, to control the second switching transistor to be turned on, so that the second receiving channel between the second electrode and the signal processing unit is turned on; and in another scenario, the control unit may also input a low level signal to the gate of the second switching transistor, to control the second switching transistor to be turned off (which may also be referred to as cut off), so that the second receiving channel between the second electrode and the signal processing unit is turned off.

In a case, the first switching transistor may be a P-type transistor. In a scenario, the control unit may input a low level signal to the gate of the first switching transistor, to control the first switching transistor to be turned on, so that the first receiving channel between the first electrode and the signal processing unit is turned on; and in another scenario, the control unit may also input a high level signal to the gate of the first switching transistor, to control the first switching transistor to be turned off, so that the first receiving channel between the first electrode and the signal processing unit is turned off. Correspondingly, the second switching transistor may also be a P-type transistor. In a scenario, the control unit may input a low level signal to the gate of the second switching transistor, to control the second switching transistor to be turned on, so that the second receiving channel between the second electrode and the signal processing unit is turned on; and in another scenario, the control unit may also input a high level signal to the gate of the second switching transistor, to control the second switching transistor to be turned off, so that the second receiving channel between the second electrode and the signal processing unit is turned off.

Certainly, it may be understood that, the first switch S1 and the second switch S2 may also be other types of switch devices. This is not specifically limited in embodiments of this application.

The signal processing unit includes an amplification unit and a filter unit connected to each other. The amplification unit is connected to the first switch S1 and the second switch S2 respectively, and the filter unit is connected to the analog to digital conversion unit.

The amplification unit is configured to amplify an uplink signal transmitted on a turned-on receiving channel, and transmit an amplified uplink signal to the filter unit. When the first receiving channel is turned on and the second receiving channel is turned off, the amplification unit is configured to amplify an uplink signal received by the first electrode; when the first receiving channel is turned off and the second receiving channel is turned on, the amplification unit is configured to amplify an uplink signal received by the second electrode; and when both the first receiving channel and the second receiving channel are turned on, the amplification unit is configured to amplify an uplink signal simultaneously received by the first electrode and the second electrode. The filter unit is configured to filter the amplified uplink signal, and transmit a filtered uplink signal to the analog to digital conversion unit.

The analog to digital conversion unit may be an analog to digital converter (analog to digital converter, ADC), and the analog to digital conversion unit is further connected to the decoding unit. The analog to digital conversion unit is configured to perform analog to digital conversion on the filtered uplink signal, and transmit an uplink signal after the analog to digital conversion to the decoding unit.

The decoding unit is further connected to the control unit, and is configured to decode the uplink signal after the analog to digital conversion. When the decoding successes, signal content in the uplink signal may be obtained, and the signal content is transmitted to the control unit.

The control unit may be a micro control unit (micro control unit, MCU), and the control unit is further connected to the emission drive unit. The control unit is configured to send a control signal to the emission drive unit based on the signal content transmitted by the decoding unit.

The emission drive unit is further connected to the first electrode and the second electrode respectively, and is configured to drive, based on the control signal sent by the control unit, the first electrode to send a first signal, and drive the second electrode to send a second signal. The first signal may also be referred to as a first downlink signal, and the second signal may also be referred to as a second downlink signal.

It may be understood that, the foregoing decoding unit and control unit may be integrated in a same chip. Certainly, the foregoing decoding unit and control unit may also be arranged independently. This is not limited in embodiments of this application.

In some embodiments, to achieve a function of signal synchronization between the electronic device and the stylus, the electronic device and the stylus support two-way information transmission based on an agreed interaction protocol.

Specifically, the electronic device sends an uplink signal based on a preset refresh frequency; a receiving electrode of the stylus receives the uplink signal sent by the electronic device, and transmits the uplink signal to the signal processing unit for processing; the uplink signal is amplified and filtered by the signal processing unit, and then transmitted to the analog to digital conversion unit; the analog to digital conversion unit performs analog to digital conversion on the uplink signal, and transmits an uplink signal after the analog to digital conversion to the decoding unit; and the decoding unit decodes the uplink signal after the analog to digital conversion. After the decoding successes, signal content in the uplink signal may be obtained, and the decoding unit transmits the signal content to the control unit; and the control unit sends a control signal to the emission drive unit based on the signal content transmitted by the decoding unit, and the emission drive unit further drives, based on the control signal sent by the control unit, the first electrode to send a first signal, and drives the second electrode to send a second signal.

Correspondingly, the electronic device samples downlink signals sent by the first electrode and the second electrode, that is, the electronic device implements touch scanning for the stylus. Therefore, the touch scanning of the electronic device and downlink signal emission of the stylus can be synchronized. In other words, when the electronic device receives a downlink signal, the stylus also emits a downlink signal. In this way, time sequences of the signal emission of the stylus and the touch scanning of the electronic device are aligned, and the electronic device can obtain a touch position of the stylus on the touch screen and an inclination angle of the stylus once based on each downlink signal. The downlink signal emitted by the stylus may be a high-voltage alternating current signal.

In a related art, when the stylus is in a working mode, the first switch S1 and the second switch S2 are always in an on state, that is, the receiving electrode of the stylus includes the first electrode and the second electrode. The stylus uses the first electrode and the second electrode to simultaneously receive an uplink signal sent by the electronic device, and the uplink signal received by the first electrode and the second electrode is gathered on a channel and then transmitted to the signal processing unit, so that signal strength of the uplink signal transmitted to the signal processing unit is high, to improve a decoding success rate of the uplink signal by the decoding unit.

Figure 8:
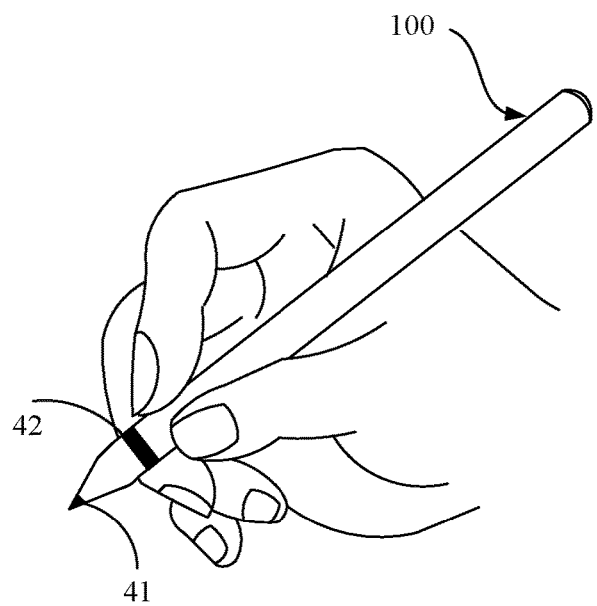
FIG. 8 is a schematic diagram of a scenario in which a user holds a stylus to which embodiments of this application are applicable.

As shown in FIG. 8, a first emitter electrode 41 and a second emitter electrode 42 are arranged in a stylus 100. The first emitter electrode 41 is located in a pen tip of the stylus 100, and the first emitter electrode 41 is used as a first electrode. The second emitter electrode 42 is located on an inner wall of a pen barrel of the stylus 100 or located on a main shaft assembly, and the second emitter electrode 42 is used as a second electrode. However, during actual use by a user, the second electrode is far away from the pen tip of the stylus. Therefore, as shown in FIG. 8, when the user holds the stylus 100 to write on an electronic device, the user's finger easily approaches or touches a region in which the second electrode (namely, the second emitter electrode 42) is located. As a conductor, a human body interferes with an uplink signal received by the second electrode due to a capacitance effect. Therefore, after the first electrode and the second electrode of the stylus receive the uplink signal sent by the electronic device, signal strength of a useful uplink signal transmitted to a signal processing unit is greatly attenuated. Particularly, when the user's hand comes into contact with a touch screen of the electronic device over a large area, the uplink signal sent by the electronic device is weakened, resulting in further attenuation of signal strength of the uplink signal transmitted to the signal processing unit through the first electrode and the second electrode.

After the signal strength of the uplink signal transmitted to the signal processing unit is attenuated, a decoding success rate of the received uplink signal by a decoding unit is greatly reduced, that is, the decoding unit may not be able to successfully decode. When decoding of the received uplink signal by the decoding unit of the stylus fails, an emission drive unit no longer drives the first electrode to send a first signal and no longer drives the second electrode to send a second signal. As a result, the electronic device cannot receive a downlink signal sent by the stylus, causing the stylus to have functional failures such as being unable to discharge ink, writing disconnection, and latency when writing.

In another related art, when the stylus is in the working mode, the first switch S1 is always in an off state, and the second switch S2 is always in an on state. In other words, in this case, the receiving electrode of the stylus includes only the second electrode, and the stylus uses only the second electrode to receive an uplink signal sent by the electronic device. When the user holds the stylus to write on the electronic device, if a finger approaches or touches the region in which the second electrode is located, signal strength of a useful uplink signal transmitted to a signal processing unit is also greatly attenuated. As a result, a decoding success rate of the received uplink signal by the decoding unit is greatly reduced, causing the stylus to have functional failures such as being unable to discharge ink, writing disconnection, and latency when writing.

Based on this, embodiments of this application provide a control method, a stylus, and a touch system. When decoding of an $N^{th}$ frame of uplink signal successes, a first target receiving channel for receiving the $N^{th}$ frame of uplink signal is continuously controlled to be turned on; and when the decoding of the $N^{th}$ frame of uplink signal fails, the first target receiving channel being turned on is switched to a second target receiving channel being turned on. Based on a decoding result of a previous frame of uplink signal, it is determined whether to switch a target receiving channel that is turned on. In this way, when decoding fails because an uplink signal received by a second electrode is interfered with, the target receiving channel that is turned on can be switched, so that an uplink signal can also be normally received to be successfully decoded within a periodicity in which a first electrode works alone, to alleviate problems caused by interference, such as the stylus being unable to discharge ink, writing disconnection, and latency, thereby greatly improving writing experience.

Based on the stylus shown in FIG. 7, a control method for a stylus provided in embodiments of this application is described below with reference to specific embodiments.

The following embodiments may be mutually combined, and same or similar concepts or processes may not be repeatedly described in some embodiments.

Figure 9:
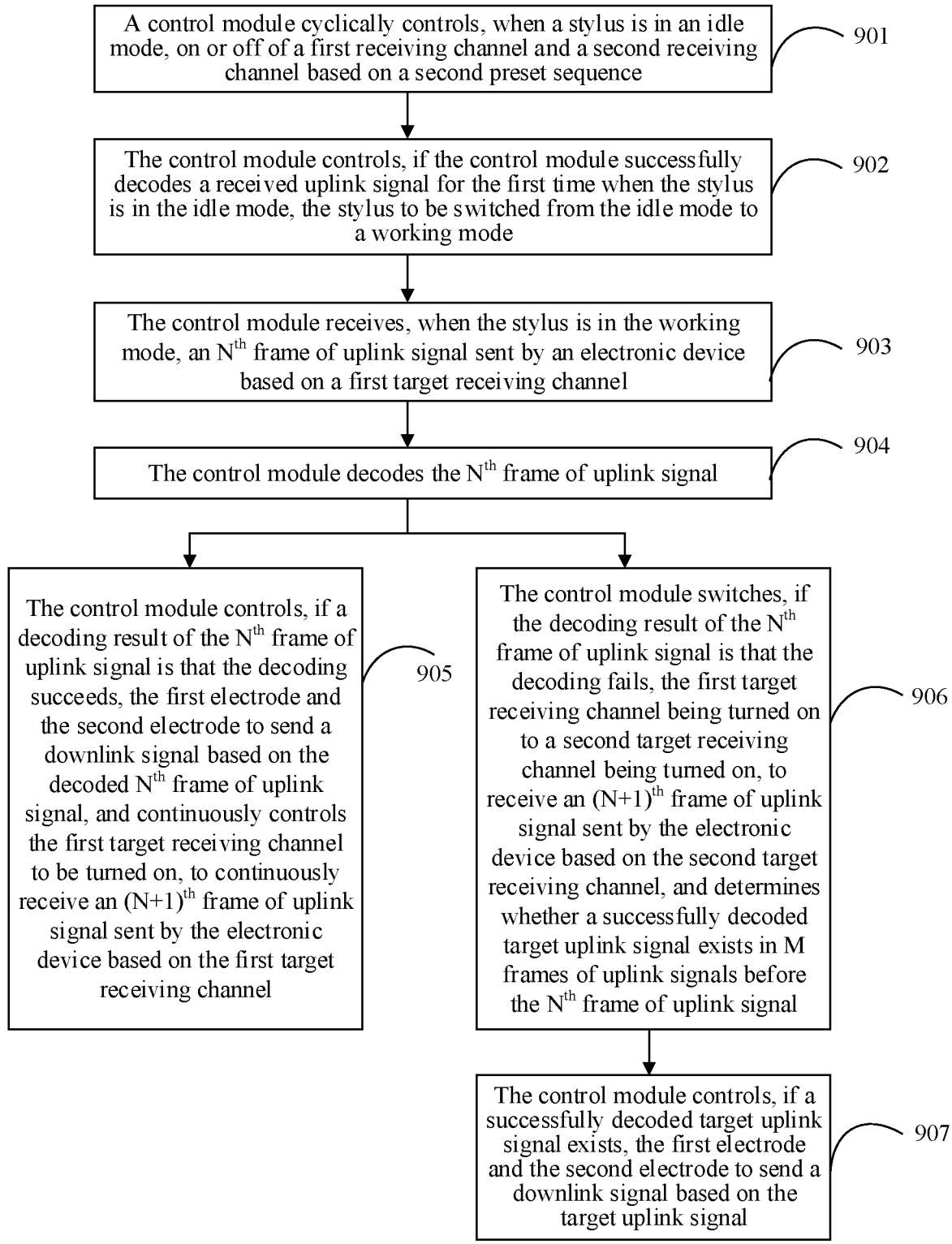
FIG. 9 is a flowchart of a control method according to an embodiment of this application.

For example, in a first optional implementation, FIG. 9 is a flowchart of a control method according to an embodiment of this application. As shown in FIG. 9, the control method for a stylus provided in this embodiment of this application may include the following steps.

Step 901: A control module cyclically controls, when the stylus is in an idle mode, on or off of a first receiving channel and a second receiving channel based on a second preset sequence.

When a user does not hold the stylus to be close to a touch screen of an electronic device, the stylus is in the idle mode. The idle mode is a mode in which the stylus only monitors an uplink signal sent by the electronic device, but does not send a downlink signal to the electronic device.

The control module cyclically controls, when the stylus is in the idle mode, on or off of the first receiving channel and the second receiving channel based on the following second preset sequence. The second preset sequence is a sequence in which both the first receiving channel and the second receiving channel are turned off, both the first receiving channel and the second receiving channel are turned on, both the first receiving channel and the second receiving channel are turned off, and the first receiving channel is turned on and the second receiving channel is turned off.

In other words, when the stylus is in the idle mode, the stylus is cyclically in an idle state, a first receiving state, the idle state, and a second receiving state. The idle state is a state when both the first receiving channel and the second receiving channel are continuously turned off, the first receiving state is a state when both the first receiving channel and the second receiving channel are continuously turned on, and the second receiving state is a state when the first receiving channel is continuously turned on and the second receiving channel is continuously turned off.

The control module includes a signal processing submodule and a control submodule, where the signal processing submodule includes the signal processing unit and the analog to digital conversion unit shown in FIG. 7, and the control submodule includes the control unit and the decoding unit shown in FIG. 7. In some embodiments, the control unit of the control module controls on or off of the first switch S1, to control on or off of the first receiving channel; and the control unit controls on or off of the second switch S2, to control on or off of the second receiving channel.

Therefore, when the stylus is in the idle mode, in a stage corresponding to the first receiving state, a first electrode and a second electrode may simultaneously and continuously detect, based on the first receiving channel and the second receiving channel, whether there is an uplink signal sent by the electronic device; and in a stage corresponding to the second receiving state, the first electrode may continuously detect, based on the first receiving channel, whether there is an uplink signal sent by the electronic device.

For example, when the stylus is in the idle mode, duration of the idle state may be 90 ms, and duration of the first receiving state and duration of the second receiving state may be 20 ms.

Step 902: The control module controls, if the control module successfully decodes a received uplink signal for the first time when the stylus is in the idle mode, the stylus to be switched from the idle mode to a working mode.

When the stylus is in the idle mode, when the decoding unit does not receive an uplink signal or decoding of the received uplink signal fails, the stylus still maintains the idle mode, and cyclically controls on or off of the first receiving channel and the second receiving channel based on the foregoing second preset sequence.

When the stylus is in the idle mode, when the decoding unit successfully decodes the received uplink signal for the first time, the control unit controls the stylus to be switched from the idle mode to the working mode. The working mode is a mode in which the stylus monitors an uplink signal sent by the electronic device, and sends a downlink signal to the electronic device based on a successfully decoded uplink signal. In addition, when the stylus is in the idle mode, a time sequence in which the stylus monitors uplink signals is synchronized with a time sequence in which the electronic device sends the uplink signals, and a time sequence in which the stylus sends downlink signals is synchronized with a time sequence in which the electronic device samples the downlink signals.

The control method for a stylus in embodiments of this application is described below with reference to three different signal time sequence diagrams shown in FIG. 10 to FIG. 12. The time sequence diagrams shown in FIG. 10 to FIG. 12 show: a time sequence in which the electronic device sends uplink signals, a time sequence in which the electronic device samples downlink signals sent by the stylus, a time sequence in which the first electrode and the second electrode (or only the first electrode) of the stylus monitor the uplink signals sent by the electronic device, and a time sequence in which the first electrode and the second electrode of the stylus send downlink signals.

Figure 10:
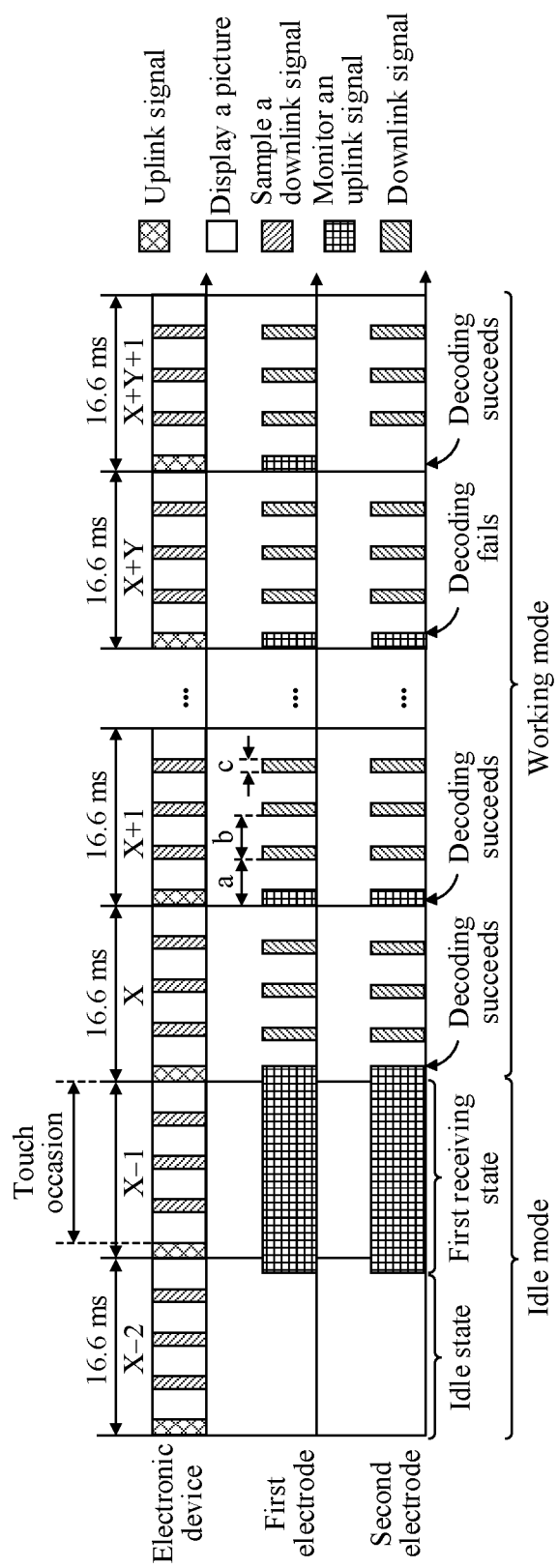
FIG. 10 is a first signal time sequence diagram according to an embodiment of this application.
Figure 11:
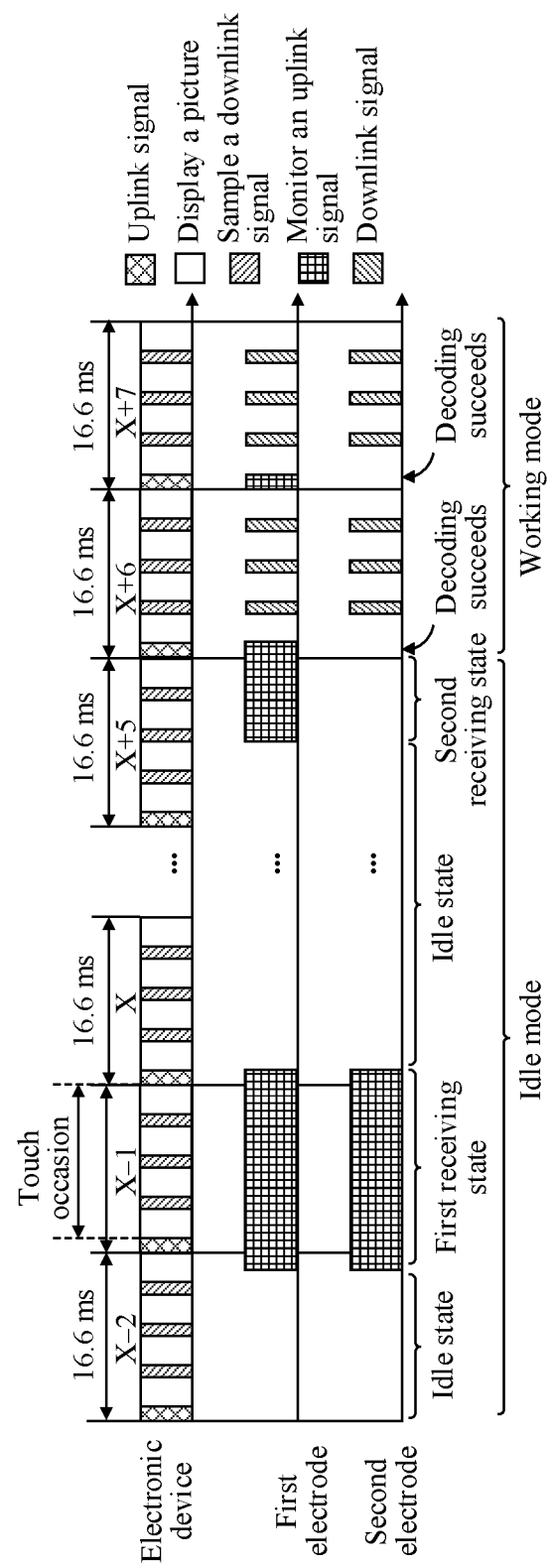
FIG. 11 is a second signal time sequence diagram according to an embodiment of this application.
Figure 12:
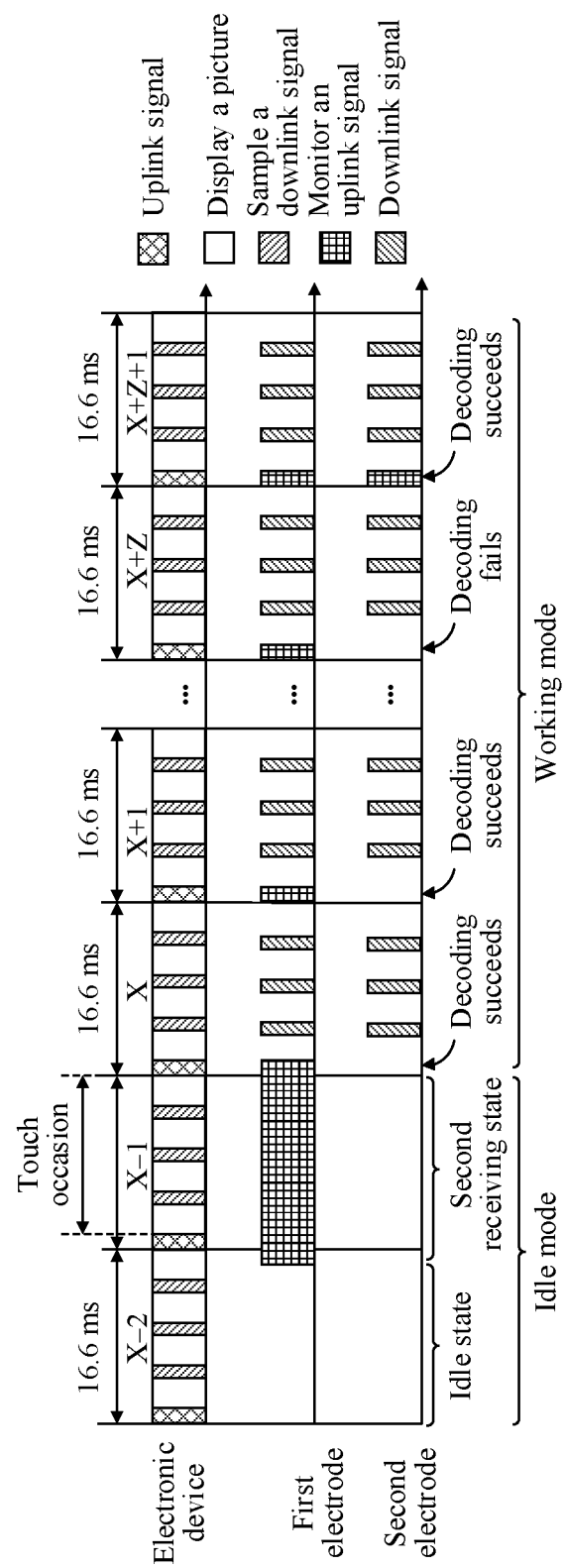
FIG. 12 is a third signal time sequence diagram according to an embodiment of this application.

In the signal time sequence diagrams shown in FIG. 10 to FIG. 12, an example in which a refresh frequency of the electronic device is 60 Hz is used for description. The electronic device refreshes a picture displayed on the touch screen at the refresh frequency of 60 Hz, and the electronic device sends an uplink signal at the refresh frequency of 60 Hz.

Certainly, it may be understood that, the refresh frequency of the electronic device may include but is not limited to: 60 Hz, 90 Hz, 120 Hz, 240 Hz, or the like. The refresh frequency of the electronic device is a quantity of refresh times of the picture displayed by the electronic device per second. The refresh frequency of the electronic device may also be referred to as a display frequency or a display frame rate.

As shown in FIG. 10 to FIG. 12, the electronic device refreshes the picture displayed on the touch screen once every 16.6 ms (1000 ms/60), and the electronic device sends an uplink signal to the stylus once every 16.6 ms, that is, a sending periodicity of the uplink signal is 16.6 ms. The sending periodicity of the uplink signal is duration between the electronic device sending two uplink signals.

In addition, the electronic device samples the downlink signals sent by the stylus based on the refresh frequency. The electronic device samples, based on the corresponding refresh frequency, K downlink signals in a display periodicity. For example, the refresh frequency of the electronic device is 60 Hz, and after the electronic device sends an uplink signal to the stylus, the electronic device may sample K downlink signals sent by the stylus within 16.6 ms. K may be preset, where K is an integer greater than or equal to 1, for example, K is 3.

A time period between the electronic device sending the uplink signal and sampling the downlink signals sent by the stylus may be for displaying the picture.

After the stylus is switched from the idle mode to the working mode, the stylus may receive an uplink signal sent by the electronic device once every 16.6 ms. After the stylus receives the uplink signal sent by the electronic device, if the uplink signal is successfully decoded, the stylus may send K downlink signals within 16.6 ms. For example, the first electrode may send K first signals within 16.6 ms, the second electrode may send K second signals within 16.6 ms, and the first signals and the second signals may be referred to as downlink signals.

In some embodiments, a configuration file is set in both the stylus and the electronic device, where the configuration file includes values of parameters a, b, and c, and K. The parameter a indicates duration between the stylus receiving the uplink signal from the electronic device and sending a first downlink signal, the parameter b indicates duration between two adjacent downlink signals sent by the stylus, the parameter c indicates duration occupied by one downlink signal sent by the stylus, and K indicates a quantity of downlink signals sent by the stylus between two adjacent uplink signals. The parameters a, b, and c, and K may be preset. To be specific, the electronic device can determine, based on the preset parameters a, b, and c, and K, a strategy of sampling downlink signals after sending the uplink signal. For example, the electronic device can sample, based on the parameters a, b, and c, downlink signals K times within a periodicity of one uplink signal. Correspondingly, the stylus in the working mode can determine, based on the preset parameters a, b, and c, and K, a strategy of sending the downlink signals. For example, after receiving the uplink signal from the electronic device, the stylus sends the K downlink signals based on the preset parameters a, b, and c.

In a first possible scenario, as shown in FIG. 10, within a time period before the electronic device sends an $(X-1)^{th}$ frame of uplink signal (including duration of the $(X-1)^{th}$ frame of uplink signal), a pen tip of the stylus does not come into contact with the touch screen of the electronic device; and the control module of the stylus does not basically receive an uplink signal sent by the electronic device, or signal strength of the uplink signal sent by the electronic device that is received by the control module of the stylus is very low. Therefore, when the decoding unit of the stylus decodes the received uplink signal, the decoding may fail. In this case, the stylus still maintains the idle mode, and cyclically controls on or off of the first receiving channel and the second receiving channel based on the foregoing second preset sequence.

For example, in FIG. 10, when the electronic device is within an $(X-2)^{th}$ frame of display periodicity, the stylus is always in the idle mode, and is switched from the idle state to the first receiving state. When the electronic device is within an $(X-1)^{th}$ frame of display periodicity, the stylus is always in the first receiving state of the idle mode; and in this case, both the first receiving channel and the second receiving channel of the stylus are continuously turned on, so that the stylus simultaneously monitors an uplink signal sent by the electronic device based on the first electrode and the second electrode.

It is assumed that a time period from after the $(X-1)^{th}$ frame of uplink signal is sent to before an $X^{th}$ frame of uplink signal is sent is an occasion at which the pen tip of the stylus comes into contact with the touch screen of the electronic device. Because both the first receiving channel and the second receiving channel of the stylus are turned on when the electronic device sends the $X^{th}$ frame of uplink signal within an $X^{th}$ frame of display periodicity, if the uplink signal received by the first electrode and the second electrode of the stylus is not interfered with (for example, a corresponding scenario when a position at which the user holds the stylus is far away from a region in which the second electrode is located), signal strength of the uplink signal transmitted by the first electrode and the second electrode to the decoding unit is high. In this way, the decoding unit can successfully decode the uplink signal, so that the control unit controls the stylus to be switched from the idle mode to the working mode.

If the uplink signal received by the second electrode is subject to very little interference or is not even interfered with when the user normally holds the stylus (in other words, the position at which the user holds the stylus is far away from the region in which the second electrode is located), the first electrode and the second electrode may simultaneously receive the uplink signal, and transmit the uplink signal to the control module through the first receiving channel and the second receiving channel. In this way, signal strength of the uplink signal finally transmitted to the control module is high, to improve a signal-to-noise ratio of the uplink signal.

In a second possible scenario, as shown in FIG. 11, within a time period before the electronic device sends an $(X-1)^{th}$ frame of uplink signal (including duration of the $(X-1)^{th}$ frame of uplink signal), the pen tip of the stylus does not come into contact with the touch screen of the electronic device, and the stylus is in the idle mode. For example, when the electronic device is within an $(X-2)^{th}$ frame of display periodicity, the stylus is always in the idle mode, and is switched from the idle state to the first receiving state. When the electronic device is within an $(X-1)^{th}$ frame of display periodicity, the stylus is always in the first receiving state of the idle mode.

It is assumed that a time period from after the $(X-1)^{th}$ frame of uplink signal is sent to before an $X^{th}$ frame of uplink signal is sent is an occasion at which the pen tip of the stylus comes into contact with the touch screen of the electronic device. Because both the first receiving channel and the second receiving channel of the stylus are turned on when the electronic device sends the $X^{th}$ frame of uplink signal within an $X^{th}$ frame of display periodicity, if the uplink signal received by the second electrode is subject to large interference because the position at which the user holds the stylus approaches or touches the region in which the second electrode is located, signal strength of the uplink signal simultaneously transmitted by the first electrode and the second electrode to the decoding unit is greatly attenuated. In this way, decoding of the uplink signal by the decoding unit fails, so that the control unit continuously controls the stylus to be in the idle state, and cyclically controls on or off of the first receiving channel and the second receiving channel based on the foregoing second preset sequence.

An example in which the duration of the idle state is 90 ms, and the duration of the first receiving state and the duration of the second receiving state are 20 ms is used. Therefore, when the electronic device is within an $X^{th}$ frame of display periodicity, the stylus is switched from the first receiving state to the idle state; and when the electronic device is within an $(X+5)^{th}$ frame of display periodicity, the stylus is switched from the idle state to the second receiving state.

Because the duration (20 ms) of the second receiving state is greater than duration (16.6 ms) of a display periodicity, the first receiving channel of the stylus is turned on and the second receiving channel is turned off when the electronic device sends an $(X+6)^{th}$ frame of uplink signal within an $(X+6)^{th}$ frame of display periodicity. Therefore, even though the position at which the user holds the stylus approaches or touches the region in which the second electrode is located, signal strength of the uplink signal transmitted by the first electrode to the decoding unit may also be high. In this way, the decoding unit can successfully decode the uplink signal, so that the control unit controls the stylus to be switched from the idle mode to the working mode.

An example in which the duration of the first receiving state and the duration of the second receiving state are 20 ms, and the display periodicity is 16.6 ms (that is, a corresponding refresh frequency is 60 Hz) is used above for description. Certainly, it may be understood that, in this embodiment of this application, the duration of the first receiving state and the duration of the second receiving state, and the display periodicity may also be set as other values. All manners of ensuring that both the duration of the first receiving state and the duration of the second receiving state are greater than the display periodicity (that is, duration between two adjacent frames of uplink signals sent by the electronic device) are applicable to this application. For example, the display periodicity may also be set as 11.1 ms (that is, a corresponding refresh frequency is 90 Hz), and the duration of the first receiving state and the duration of the second receiving state are set as 13 ms.

In a third possible scenario, as shown in FIG. 12, within a time period before the electronic device sends an $(X-1)^{th}$ frame of uplink signal (including duration of the $(X-1)^{th}$ frame of uplink signal), the pen tip of the stylus does not come into contact with the touch screen of the electronic device, and the stylus is in the idle mode. For example, when the electronic device is within an $(X-2)^{th}$ frame of display periodicity, the stylus is always in the idle mode, and is switched from the idle state to the second receiving state. When the electronic device is within an $(X-1)^{th}$ frame of display periodicity, the stylus is always in the second receiving state of the idle mode.

It is assumed that a time period from after the $(X-1)^{th}$ frame of uplink signal is sent to before an $X^{th}$ frame of uplink signal is sent is an occasion at which the pen tip of the stylus comes into contact with the touch screen of the electronic device. Because the first receiving channel of the stylus is turned on and the second receiving channel is turned off when the electronic device sends an $X^{th}$ frame of uplink signal within an $X^{th}$ frame of display periodicity, if the position at which the user holds the stylus approaches or touches the region in which the second electrode is located, signal strength of the uplink signal transmitted by the first electrode to the decoding unit may also be high. In this way, the decoding unit can successfully decode the uplink signal, so that the control unit controls the stylus to be switched from the idle mode to the working mode.

In other words, if the position at which the user holds the stylus approaches or touches the region in which the second electrode is located, the uplink signal received by the second electrode is subject to large interference. Therefore, only the first electrode may receive the uplink signal, and transmit the uplink signal to the control module through the first receiving channel, so that the decoding unit can also successfully decode in the scenario.

Step 903: The control module receives, when the stylus is in the working mode, an $N^{th}$ frame of uplink signal sent by the electronic device based on a first target receiving channel.

In some embodiments, when the stylus is in the working mode, the control unit may control on or off of the first switch S1 and the second switch S2, to control the first target receiving channel to be turned on. In this case, the $N^{th}$ frame of uplink signal sent by the electronic device that is received by a receiving electrode (the first electrode and the second electrode, or the first electrode) of the stylus may be transmitted to the control module through the first target receiving channel.

The first target receiving channel is a first preset channel or a second preset channel; and the first preset channel includes the first receiving channel and the second receiving channel, and the second preset channel includes the first receiving channel.

In a first case, as shown in FIG. 10, when the electronic device is within the $X^{th}$ frame of display periodicity, the stylus is switched from the idle mode to the working mode. In addition, when the electronic device is within the $X^{th}$ frame of display periodicity to an $(X+Y+1)^{th}$ frame of display periodicity, the stylus is always in the working mode, where Y is a positive integer greater than 1.

As shown in FIG. 10, when the electronic device is within the $X^{th}$ frame of display periodicity, the first target receiving channel is the first preset channel, where the first preset channel includes the first receiving channel and the second receiving channel. To be specific, the first electrode and the second electrode of the stylus simultaneously receive the $X^{th}$ frame of uplink signal sent by the electronic device, and transmit the uplink signal to the control module based on the first receiving channel and the second receiving channel.

For example, the $N^{th}$ frame of uplink signal sent by the electronic device may be the $X^{th}$ frame of uplink signal shown in FIG. 10, and a corresponding first target receiving channel includes the first receiving channel and the second receiving channel. The $N^{th}$ frame of uplink signal sent by the electronic device may also be each uplink signal in an $(X+1)^{th}$ frame of uplink signal to an $(X+Y)^{th}$ frame of uplink signal shown in FIG. 10, and each corresponding first target receiving channel includes the first receiving channel and the second receiving channel.

In a second case, as shown in FIG. 11, when the electronic device is within the $(X+6)^{th}$ frame of display periodicity, the stylus is switched from the idle mode to the working mode. In addition, when the electronic device is within an $(X+7)^{th}$ frame of display periodicity, the stylus is also always in the working mode.

As shown in FIG. 11, when the electronic device is within the $(X+6)^{th}$ frame of display periodicity, the first target receiving channel is the second preset channel, where the second preset channel is the first receiving channel. To be specific, the first electrode of the stylus receives the $(X+6)^{th}$ frame of uplink signal sent by the electronic device, and transmits the uplink signal to the control module pass through the first receiving channel.

For example, the $N^{th}$ frame of uplink signal sent by the electronic device may be the $(X+6)^{th}$ frame of uplink signal shown in FIG. 11, and a corresponding first target receiving channel is the first receiving channel. The $N^{th}$ frame of uplink signal sent by the electronic device may also be an $(X+7)^{th}$ frame of uplink signal shown in FIG. 11, and a corresponding first target receiving channel is also the first receiving channel.

In a third case, as shown in FIG. 12, when the electronic device is within the $X^{th}$ frame of display periodicity, the stylus is switched from the idle mode to the working mode. In addition, when the electronic device is within the $X^{th}$ frame of display periodicity to an $(X+Z+1)^{th}$ frame of display periodicity, the stylus is always in the working mode, where Z is a positive integer greater than 1.

As shown in FIG. 12, when the electronic device is within the $X^{th}$ frame of display periodicity, the first target receiving channel is the second preset channel, where the second preset channel is the first receiving channel. To be specific, the first electrode of the stylus receives the $X^{th}$ frame of uplink signal sent by the electronic device, and transmits the uplink signal to the control module pass through the first receiving channel.

For example, the $N^{th}$ frame of uplink signal sent by the electronic device may be the $X^{th}$ frame of uplink signal shown in FIG. 12, and a corresponding first target receiving channel is the first receiving channel. The $N^{th}$ frame of uplink signal sent by the electronic device may also be each uplink signal in an $(X+1)^{th}$ frame of uplink signal to an $(X+Z)^{th}$ frame of uplink signal shown in FIG. 12, and each corresponding first target receiving channel is the first receiving channel.

Step 904: The control module decodes the $N^{th}$ frame of uplink signal.

In this embodiment of this application, after the control module receives the $N^{th}$ frame of uplink signal, the signal processing unit of the control module sequentially amplifies and filters the $N^{th}$ frame of uplink signal, and transmits an amplified and filtered uplink signal to the analog to digital conversion unit of the control module. The analog to digital conversion unit of the control module continuously performs analog to digital conversion on the uplink signal, and transmits an uplink signal after the analog to digital conversion to the decoding unit. The decoding unit of the control module decodes the uplink signal after the analog to digital conversion.

In some embodiments, after the uplink signal after the analog to digital conversion transmitted by the analog to digital conversion unit is received, the decoding unit needs to first determine whether signal strength of the uplink signal after the analog to digital conversion is greater than or equal to a receiving decoding threshold. If the signal strength of the uplink signal after the analog to digital conversion is greater than or equal to the receiving decoding threshold, the decoding unit decodes the uplink signal after the analog to digital conversion. If the signal strength of the uplink signal after the analog to digital conversion is less than the receiving decoding threshold, the decoding unit does not decode the uplink signal after the analog to digital conversion.

It should be noted that, when the receiving electrode configured to receive the uplink signal is different, the receiving decoding threshold is also different. For example, when the first electrode and the second electrode simultaneously receive the uplink signal, the receiving decoding threshold may be a first receiving decoding threshold; when only the first electrode receives the uplink signal, the receiving decoding threshold may be a second receiving decoding threshold; and when only the second electrode receives the uplink signal, the receiving decoding threshold may be a third receiving decoding threshold. The first receiving decoding threshold, the second receiving decoding threshold, and the third receiving decoding threshold each are different.

Therefore, the decoding unit needs to select the corresponding receiving decoding threshold based on the receiving electrode configured to receive the uplink signal, and compares the receiving decoding threshold with the signal strength of the uplink signal after the analog to digital conversion, to determine whether to decode the uplink signal after the analog to digital conversion. For example, when the receiving electrode configured to receive the uplink signal includes the first electrode and the second electrode, the decoding unit compares the first receiving decoding threshold with the signal strength of the uplink signal after the analog to digital conversion; when the receiving electrode configured to receive the uplink signal includes only the first electrode, the decoding unit compares the second receiving decoding threshold with the signal strength of the uplink signal after the analog to digital conversion; and when the receiving electrode configured to receive the uplink signal includes only the second electrode, the decoding unit compares the third receiving decoding threshold with the signal strength of the uplink signal after the analog to digital conversion.

A surface area of the first electrode is larger than a surface area of the second electrode. Therefore, when setting receiving decoding thresholds corresponding to different receiving electrodes, the first receiving decoding threshold may be set to be greater than the third receiving decoding threshold, and the third receiving decoding threshold is greater than the second receiving decoding threshold.

Step 905: The control module controls, if a decoding result of the $N^{th}$ frame of uplink signal is that the decoding succeeds, the first electrode and the second electrode to send a downlink signal based on the decoded $N^{th}$ frame of uplink signal, and continuously controls the first target receiving channel to be turned on, to continuously receive an $(N+1)^{th}$ frame of uplink signal sent by the electronic device based on the first target receiving channel.

In this embodiment of this application, if the decoding unit successfully decodes the $N^{th}$ frame of uplink signal, the decoding unit may obtain signal content of the $N^{th}$ frame of uplink signal, and transmit the signal content to the control unit; and the control unit controls, based on the signal content of the $N^{th}$ frame of uplink signal, the first electrode and the second electrode to sequentially send K downlink signals. In this case, the electronic device samples each downlink signal sent by the stylus, and can obtain a touch position of the stylus on the touch screen, an inclination angle of the stylus, and the like once based on each downlink signal, to achieve synchronization between the electronic device and the stylus.

In addition, a target receiving channel for receiving the $(N+1)^{th}$ frame of uplink signal is related to a target receiving channel for receiving the $N^{th}$ frame of uplink signal and the decoding result of the $N^{th}$ frame of uplink signal.

If the target receiving channel for receiving the $N^{th}$ frame of uplink signal is the first target receiving channel and the decoding result of the $N^{th}$ frame of uplink signal is that the decoding succeeds, the target receiving channel for receiving the $(N+1)^{th}$ frame of uplink signal is still the first target receiving channel. Therefore, the control unit continuously controls on or off of the first switch S1 and the second switch S2, to continuously control the first target receiving channel to be turned on. In this case, the stylus may receive the $(N+1)^{th}$ frame of uplink signal sent by the electronic device through a receiving electrode corresponding to the first target receiving channel, and transmit the received $(N+1)^{th}$ frame of uplink signal to the control module through the first target receiving channel.

For example, the first target receiving channel may include the first receiving channel and the second receiving channel. In this case, the receiving electrode corresponding to the first target receiving channel includes the first electrode and the second electrode, and the first electrode and the second electrode may simultaneously receive the $(N+1)^{th}$ frame of uplink signal sent by the electronic device, and transmit the received $(N+1)^{th}$ frame of uplink signal to the control module through the first receiving channel and the second receiving channel. Alternatively, the first target receiving channel is the first receiving channel. In this case, the receiving electrode corresponding to the first target receiving channel includes only the first electrode, and the first electrode receives the $(N+1)^{th}$ frame of uplink signal sent by the electronic device, and transmits the received $(N+1)^{th}$ frame of uplink signal to the control module through the first receiving channel.

In a first case, as shown in FIG. 10, it is assumed that the $N^{th}$ frame of uplink signal sent by the electronic device is the $X^{th}$ frame of uplink signal shown in FIG. 10, the corresponding first target receiving channel includes the first receiving channel and the second receiving channel, and the decoding unit successfully decodes the $X^{th}$ frame of uplink signal. In this case, the $(N+1)^{th}$ frame of uplink signal is the $(X+1)^{th}$ frame of uplink signal shown in FIG. 10, and a first target receiving channel corresponding to the $(X+1)^{th}$ frame of uplink signal still includes the first receiving channel and the second receiving channel. Correspondingly, it is assumed that the $N^{th}$ frame of uplink signal sent by the electronic device is the $(X+1)^{th}$ uplink signal shown in FIG. 10, the corresponding first target receiving channel includes the first receiving channel and the second receiving channel, and the decoding unit successfully decodes the $(X+1)^{th}$ uplink signal. In this case, the $(N+1)^{th}$ frame of uplink signal is an $(X+2)^{th}$ frame of uplink signal in FIG. 10, and a first target receiving channel corresponding to the $(X+2)^{th}$ frame of uplink signal still includes the first receiving channel and the second receiving channel.

By analogy based on the foregoing manner, if the $(X+2)^{th}$ frame of uplink signal to an $(X+Y-1)^{th}$ frame of uplink signal each are successfully decoded, for each uplink signal in the $(X+2)^{th}$ frame of uplink signal to the $(X+Y-1)^{th}$ frame of uplink signal, each corresponding first target receiving channel includes the first receiving channel and the second receiving channel.

It is assumed that the $N^{th}$ frame of uplink signal sent by the electronic device is the $(X+Y-1)^{th}$ frame of uplink signal shown in FIG. 10, a corresponding first target receiving channel includes the first receiving channel and the second receiving channel, and the decoding unit successfully decodes the $(X+Y-1)^{th}$ frame of uplink signal. In this case, the $(N+1)^{th}$ frame of uplink signal is the $(X+Y)^{th}$ frame of uplink signal shown in FIG. 10, and a first target receiving channel corresponding to the $(X+Y)^{th}$ frame of uplink signal still includes the first receiving channel and the second receiving channel.

In a second case, as shown in FIG. 11, it is assumed that the $N^{th}$ frame of uplink signal sent by the electronic device is the $(X+6)^{th}$ frame of uplink signal shown in FIG. 11, the corresponding first target receiving channel is the first receiving channel, and the decoding unit successfully decodes the $(X+6)^{th}$ frame of uplink signal. In this case, the $(N+1)^{th}$ frame of uplink signal is the $(X+7)^{th}$ frame of uplink signal shown in FIG. 11, and the first target receiving channel corresponding to the $(X+7)^{th}$ frame of uplink signal is still the first receiving channel.

In a third case, as shown in FIG. 12, it is assumed that the $N^{th}$ frame of uplink signal sent by the electronic device is the $X^{th}$ frame of uplink signal shown in FIG. 12, the corresponding first target receiving channel is the first receiving channel, and the decoding unit successfully decodes the $X^{th}$ frame of uplink signal. In this case, the $(N+1)^{th}$ frame of uplink signal is the $(X+1)^{th}$ frame of uplink signal shown in FIG. 12, and a first target receiving channel corresponding to the $(X+1)^{th}$ frame of uplink signal is still the first receiving channel. Correspondingly, it is assumed that the $N^{th}$ frame of uplink signal sent by the electronic device is X+1 uplink signals shown in FIG. 12, the corresponding first target receiving channel is the first receiving channel, and the decoding unit successfully decodes the $(X+1)^{th}$ uplink signal. In this case, the $(N+1)^{th}$ frame of uplink signal is an $(X+2)^{th}$ frame of uplink signal in FIG. 12, and a first target receiving channel corresponding to the $(X+2)^{th}$ frame of uplink signal is still the first receiving channel.

By analogy based on the foregoing manner, if the $(X+2)^{th}$ frame of uplink signal to an $(X+Z-1)^{th}$ frame of uplink signal each are successfully decoded, for each uplink signal in the $(X+2)^{th}$ frame of uplink signal to the $(X+Z-1)^{th}$ frame of uplink signal, each corresponding first target receiving channel is the first receiving channel.

It is assumed that the $N^{th}$ frame of uplink signal sent by the electronic device is the $(X+Z-1)^{th}$ frame of uplink signal shown in FIG. 12, a corresponding first target receiving channel includes the first receiving channel, and the decoding unit successfully decodes the $(X+Z-1)^{th}$ frame of uplink signal. In this case, the $(N+1)^{th}$ frame of uplink signal is the $(X+Z)^{th}$ frame of uplink signal shown in FIG. 12, and a first target receiving channel corresponding to the $(X+Z)^{th}$ frame of uplink signal is still the first receiving channel.

It may be understood that, in some embodiments, the stylus may also use only the first electrode to send a downlink signal, or use only the second electrode to send a downlink signal. The downlink signal sent by the first electrode is referred to as a first signal, and the downlink signal sent by the second electrode includes a second signal. Therefore, when the first electrode and the second electrode are simultaneously used to send a downlink signal, the downlink signal includes the first signal and the second signal.

Step 906: The control module switches, if the decoding result of the $N^{th}$ frame of uplink signal is that the decoding fails, the first target receiving channel being turned on to a second target receiving channel being turned on, to receive an $(N+1)^{th}$ frame of uplink signal sent by the electronic device based on the second target receiving channel, and determines whether a successfully decoded target uplink signal exists in M frames of uplink signals before the $N^{th}$ frame of uplink signal.

If a target receiving channel for receiving the $N^{th}$ frame of uplink signal is the first target receiving channel and the decoding result of the $N^{th}$ frame of uplink signal is that the decoding fails, a target receiving channel for receiving the $(N+1)^{th}$ frame of uplink signal is switched from the first target receiving channel to the second target receiving channel. Therefore, the control unit controls on or off of the first switch S1 and the second switch S2, to switch the first target receiving channel being turned on to the second target receiving channel being turned on. In this case, the stylus may receive the $(N+1)^{th}$ frame of uplink signal sent by the electronic device through a receiving electrode corresponding to the second target receiving channel, and transmit the received $(N+1)^{th}$ frame of uplink signal to the control module through the second target receiving channel.

For example, the first target receiving channel may include the first receiving channel and the second receiving channel, and the decoding result of the $N^{th}$ frame of uplink signal is that the decoding fails. In this case, the second target receiving channel is the first receiving channel, the receiving electrode corresponding to the second target receiving channel includes only the first electrode, and the first electrode receives the $(N+1)^{th}$ frame of uplink signal sent by the electronic device, and transmits the received $(N+1)^{th}$ frame of uplink signal to the control module through the first receiving channel. Alternatively, the first target receiving channel is the first receiving channel, the decoding result of the $N^{th}$ frame of uplink signal is that the decoding fails. In this case, the second target receiving channel includes the first receiving channel and the second receiving channel, the receiving electrode corresponding to the second target receiving channel includes the first electrode and the second electrode, and the first electrode and the second electrode may simultaneously receive the $(N+1)^{th}$ frame of uplink signal sent by the electronic device, and transmit the received $(N+1)^{th}$ frame of uplink signal to the control module through the first receiving channel and the second receiving channel.

In a case, as shown in FIG. 10, it is assumed that the $N^{th}$ frame of uplink signal sent by the electronic device is the $(X+Y)^{th}$ frame of uplink signal shown in FIG. 10, a corresponding first target receiving channel includes the first receiving channel and the second receiving channel, and decoding of the $(X+Y)^{th}$ frame of uplink signal by the decoding unit fails. In this case, the $(N+1)^{th}$ frame of uplink signal is an $(X+Y+1)^{th}$ frame of uplink signal shown in FIG. 10, and a second target receiving channel corresponding to the $(X+Y+1)^{th}$ frame of uplink signal is the first receiving channel. In other words, the control unit switches the first target receiving channel being turned on to the second target receiving channel being turned on.

For example, a first target receiving channel corresponding to the $(X+Y)^{th}$ frame of uplink signal includes the first receiving channel and the second receiving channel. If the user's finger approaches or touches the region in which the second electrode is located within a time period after the electronic device sends an $(X+Y-1)^{th}$ frame of uplink signal, the decoding of the $(X+Y)^{th}$ frame of uplink signal fails. Therefore, the $(X+Y+1)^{th}$ frame of uplink signal sent by the electronic device is received by switching to the first receiving channel, so that the $(X+Y+1)^{th}$ frame of uplink signal can be successfully decoded.

In another case, as shown in FIG. 12, it is assumed that the $N^{th}$ frame of uplink signal sent by the electronic device is the $(X+Z)^{th}$ frame of uplink signal shown in FIG. 12, a corresponding first target receiving channel is the first receiving channel, and decoding of the $(X+Z)^{th}$ frame of uplink signal by the decoding unit fails. In this case, the $(N+1)^{th}$ frame of uplink signal is an $(X+Z+1)^{th}$ frame of uplink signal shown in FIG. 12, and a second target receiving channel corresponding to the $(X+Z+1)^{th}$ frame of uplink signal includes the first receiving channel and the second receiving channel. In other words, the control unit switches the first target receiving channel being turned on to the second target receiving channel being turned on.

For example, the first target receiving channel corresponding to the $(X+Z)^{th}$ frame of uplink signal is the first receiving channel. If the user's finger touches the touch screen of the electronic device within a time period after the electronic device sends an $(X+Z-1)^{th}$ frame of uplink signal, signal strength of the uplink signal sent by the electronic device is weakened; and due to the smaller surface area of the first electrode, the signal strength of the uplink signal transmitted to the decoding unit through the first electrode is low, causing the decoding of the $(X+Z)^{th}$ frame of uplink signal to fail. Alternatively, if the electronic device is plugged into a charger for charging within the time period after the electronic device sends the $(X+Z-1)^{th}$ frame of uplink signal, a signal-to-noise ratio of the uplink signal sent by the electronic device is low due to interference noise caused by a power grid during charging. Therefore, the signal-to-noise ratio of the uplink signal transmitted to the decoding unit through the first electrode is also low, also causing the decoding of the $(X+Z)^{th}$ frame of uplink signal to fail. Therefore, the $(X+Z+1)^{th}$ frame of uplink signal sent by the electronic device may be received by switching to the first receiving channel and the second receiving channel, so that the $(X+Z+1)^{th}$ frame of uplink signal can be successfully decoded.

In addition, because the decoding result of the $N^{th}$ frame of uplink signal is that the decoding fails, the control unit cannot control the first electrode and the second electrode to send the downlink signal based on the decoded $N^{th}$ frame of uplink signal. Therefore, to ensure that the control unit can continuously control the first electrode and the second electrode to send the downlink signal, the control module needs to determine whether a successfully decoded target uplink signal exists in the M frames of uplink signals before the $N^{th}$ frame of uplink signal.

M is a positive integer. For example, M may be 5, 10, 15, 20, or the like. A specific value of M may be set based on an empirical value.

Step 907: The control module controls, if a successfully decoded target uplink signal exists, the first electrode and the second electrode to send a downlink signal based on the target uplink signal.

If the control unit determines that a successfully decoded target uplink signal exists in the M frames of uplink signals before the $N^{th}$ frame of uplink signal, the control unit may control the first electrode and the second electrode to send the downlink signal based on the successfully decoded target uplink signal.

Therefore, when the decoding of the $N^{th}$ frame of uplink signal fails, the control unit can still continuously control the first electrode and the second electrode to send the downlink signal based on the successfully decoded target uplink signal. In this way, the electronic device can sample each downlink signal sent by the stylus, and can obtain a touch position of the stylus on the touch screen, an inclination angle of the stylus, and the like once based on each downlink signal, to achieve synchronization between the electronic device and the stylus, thereby further alleviating problems caused by the interference, such as the stylus being unable to discharge ink, writing disconnection, and latency.

In a case, as shown in FIG. 10, if the $N^{th}$ frame of uplink signal sent by the electronic device is the $(X+Y)^{th}$ frame of uplink signal shown in FIG. 10 and decoding of the $(X+Y)^{th}$ frame of uplink signal by the decoding unit fails, the control unit determines whether a successfully decoded target uplink signal exists in an $(X+Y-M)^{th}$ frame of uplink signal to the $(X+Y-1)^{th}$ frame of uplink signal. X+Y-M being greater than X is used as an example. In this case, it may be determined that each uplink signal in the $(X+Y-M)^{th}$ frame of uplink signal to the $(X+Y-1)^{th}$ frame of uplink signal is successfully decoded. Therefore, each uplink signal in the $(X+Y-M)^{th}$ frame of uplink signal to the $(X+Y-1)^{th}$ frame of uplink signal may be used as a target uplink signal, and the control unit controls the first electrode and the second electrode send the downlink signal based on any target uplink signal in the $(X+Y-M)^{th}$ frame of uplink signal to the $(X+Y-1)^{th}$ frame of uplink signal.

For example, Y may be 100, and M may be 10. If decoding of an $(X+100)^{th}$ frame of uplink signal by the decoding unit fails, and the control unit determines that each uplink signal in an $(X+90)^{th}$ frame of uplink signal to an $(X+99)^{th}$ frame of uplink signal is successfully decoded, each uplink signal in the $(X+90)^{th}$ frame of uplink signal to the $(X+99)^{th}$ frame of uplink signal may be used as a target uplink signal.

In another case, as shown in FIG. 12, if the $N^{th}$ frame of uplink signal sent by the electronic device is the $(X+Z)^{th}$ frame of uplink signal shown in FIG. 12 and decoding of the $(X+Z)^{th}$ frame of uplink signal by the decoding unit fails, the control unit determines whether a successfully decoded target uplink signal exists in an $(X+Z-M)^{th}$ frame of uplink signal to the $(X+Z-1)^{th}$ frame of uplink signal. $X+Z-M$ being greater than X is used as an example. In this case, it may be determined that each uplink signal in the $(X+Z-M)^{th}$ frame of uplink signal to the $(X+Z-1)^{th}$ frame of uplink signal is successfully decoded. Therefore, each uplink signal in the $(X+Z-M)^{th}$ frame of uplink signal to the $(X+Z-1)^{th}$ frame of uplink signal may be used as a target uplink signal, and the control unit controls the first electrode and the second electrode send the downlink signal based on any target uplink signal in the $(X+Z-M)^{th}$ frame of uplink signal to the $(X+Z-1)^{th}$ frame of uplink signal.

For example, Z may be 200, and M may be 10. If decoding of an $(X+200)^{th}$ frame of uplink signal by the decoding unit fails, and the control unit determines that each uplink signal in an $(X+190)^{th}$ frame of uplink signal to an $(X+199)^{th}$ frame of uplink signal is successfully decoded, each uplink signal in the $(X+190)^{th}$ frame of uplink signal to the $(X+199)^{th}$ frame of uplink signal may be used as a target uplink signal.

In some embodiments, when the decoding of the $N^{th}$ frame of uplink signal fails, if the control unit determines that only one successfully decoded target uplink signal exists in the M frames of uplink signals before the $N^{th}$ frame of uplink signal, the control unit may directly control the first electrode and the second electrode to send the downlink signal based on the successfully decoded target uplink signal.

In some other embodiments, when the decoding of the $N^{th}$ frame of uplink signal fails, if the control unit determines that a plurality of successfully decoded target uplink signals exist in the M frames of uplink signals before the $N^{th}$ frame of uplink signal, the control unit may control the first electrode and the second electrode to send the downlink signal based on a target uplink signal closest to the $N^{th}$ frame of uplink signal.

For example, as shown in FIG. 10, it is assumed that the $N^{th}$ frame of uplink signal sent by the electronic device is the $(X+Y)^{th}$ frame of uplink signal shown in FIG. 10, the decoding of the $(X+Y)^{th}$ frame of uplink signal by the decoding unit fails, and each uplink signal in the $(X+Y-M)^{th}$ frame of uplink signal to the $(X+Y-1)^{th}$ frame of uplink signal is successfully decoded. In this case, the control unit may control the first electrode and the second electrode to send the downlink signal based on the $(X+Y-1)^{th}$ frame of uplink signal.

As shown in FIG. 12, it is assumed that the $N^{th}$ frame of uplink signal sent by the electronic device is the $(X+Z)^{th}$ frame of uplink signal shown in FIG. 12, the decoding of the $(X+Z)^{th}$ frame of uplink signal by the decoding unit fails, and each uplink signal in the $(X+Z-M)^{th}$ frame of uplink signal to the $(X+Z-1)^{th}$ frame of uplink signal is successfully decoded. In this case, the control unit may control the first electrode and the second electrode to send the downlink signal based on the $(X+Z-1)^{th}$ frame of uplink signal.

It should be noted that, when the decoding of the $N^{th}$ frame of uplink signal fails, if the control unit selects a target uplink signal with a farther time interval to the $N^{th}$ frame of uplink signal to control the first electrode and the second electrode to send the downlink signal, a large time offset between a time sequence in which the stylus sends downlink signals and a time sequence in which the electronic device samples the downlink signals may be caused, in other words, the time sequence in which the stylus sends the downlink signals is not synchronized with the time sequence in which the electronic device samples the downlink signals. As a result, it is possible that the electronic device cannot sample the downlink signals sent by the stylus. Therefore, when the decoding of the $N^{th}$ frame of uplink signal fails, the control unit selects the target uplink signal with a closest time interval to the $N^{th}$ frame of uplink signal to control the first electrode and the second electrode to send the downlink signal. In this way, the time sequence in which the stylus sends the downlink signals can be synchronized with the time sequence in which the electronic device samples the downlink signals, so that the electronic device can normally sample the downlink signals sent by the stylus, thereby further alleviating the problems caused by the interference, such as the stylus being unable to discharge ink, the writing disconnection, and the latency.

In some scenarios, when the stylus is in the working mode, if the decoding unit of the control module unsuccessfully decodes all received uplink signals within preset duration or the decoding unit does not receive any uplink signal within the preset duration, the control unit of the control module controls the stylus to be switched from the working mode to the idle mode.

The preset duration may be set based on an empirical value or may be manually set. For example, the preset duration may be 10 seconds. If the decoding unit unsuccessfully decodes all the received uplink signals within preset duration or the decoding unit does not receive any uplink signal within the preset duration, it may be considered that the user has moved the pen tip of the stylus to a position far away from the touch screen of the electronic device, in other words, the user no longer uses the stylus to perform an operation on the electronic device. Therefore, the stylus may be switched from the working mode to the idle mode.

In summary, in an optional implementation of this application, when the stylus is in the working mode, based on a decoding result of a previous frame ($N^{th}$ frame) of uplink signal, it may be determined whether to switch a target receiving channel for receiving a current frame ($(N+1)^{th}$ frame) of uplink signal. If the decoding result of the previous frame of uplink signal is that decoding succeeds, the target receiving channel for receiving the current frame of uplink signal is not switched, in other words, a target receiving channel for receiving the previous frame of uplink signal is consistent with the target receiving channel for receiving the current frame of uplink signal. However, if the decoding result of the previous frame of uplink signal is that the decoding fails, the target receiving channel for receiving the current frame of uplink signal is switched, in other words, a target receiving channel for receiving the previous frame of uplink signal is not consistent with the target receiving channel for receiving the current frame of uplink signal.

Based on the foregoing manner, when decoding fails because an uplink signal received by the second electrode is interfered with, the target receiving channel that is turned on may be switched, so that an uplink signal can also be normally received to be successfully decoded within a periodicity in which the first electrode works alone, to alleviate problems caused by interference, such as the stylus being unable to discharge ink, writing disconnection, and latency, thereby greatly improving writing experience.

Figure 13:
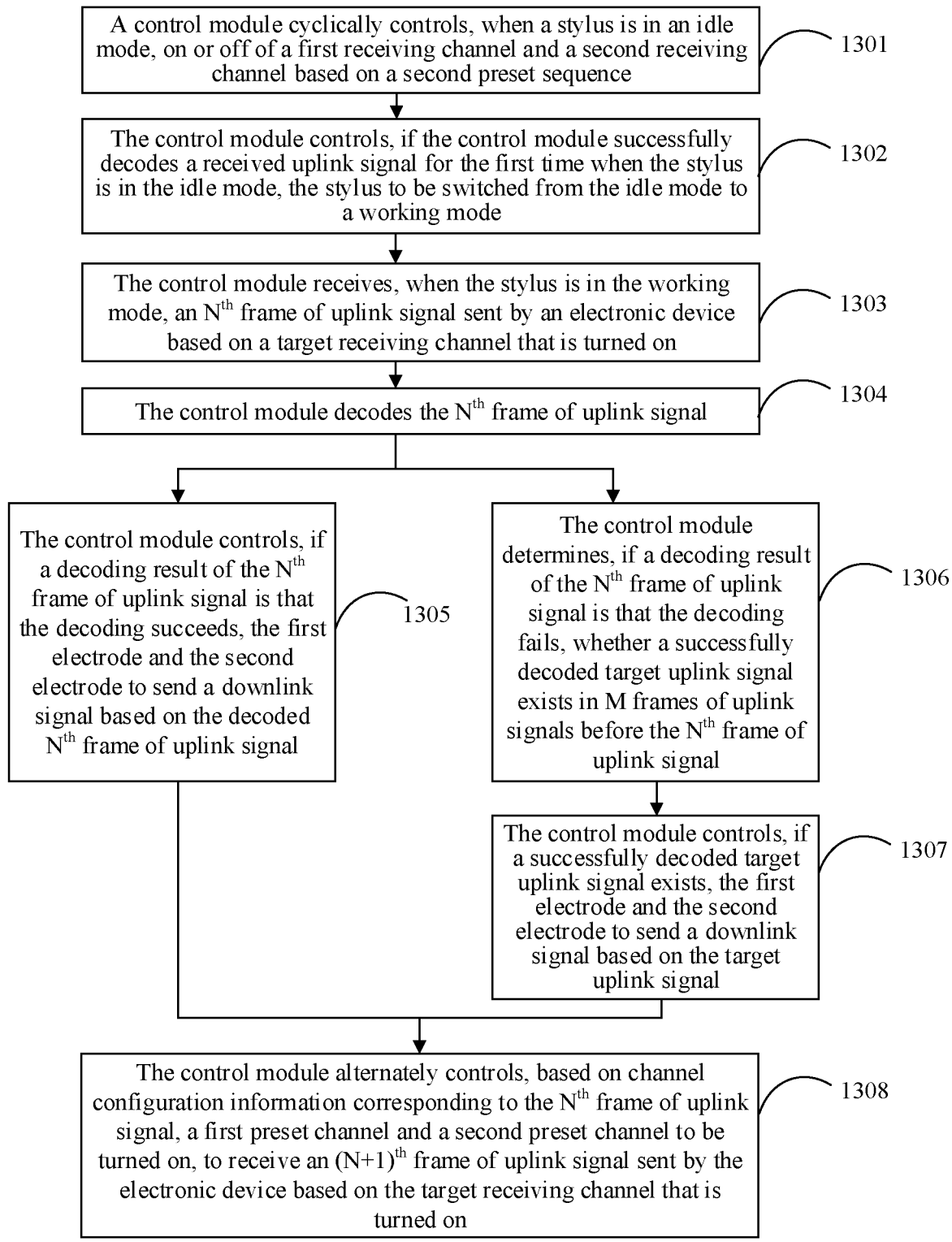
FIG. 13 is a flowchart of another control method according to an embodiment of this application.

In a second optional implementation, FIG. 13 is a flowchart of another control method according to an embodiment of this application. As shown in FIG. 13, the control method for a stylus provided in this embodiment of this application may include the following steps.

Step 1301: A control module cyclically controls, when the stylus is in an idle mode, on or off of a first receiving channel and a second receiving channel based on a second preset sequence.

Step 1302: The control module controls, if the control module successfully decodes a received uplink signal for the first time when the stylus is in the idle mode, the stylus to be switched from the idle mode to a working mode.

An execution process of step 1301 is similar to an execution process of step 901, and an execution process of step 1302 is similar to an execution process of step 902. To avoid repetitions, details are not described herein again.

Figure 14:
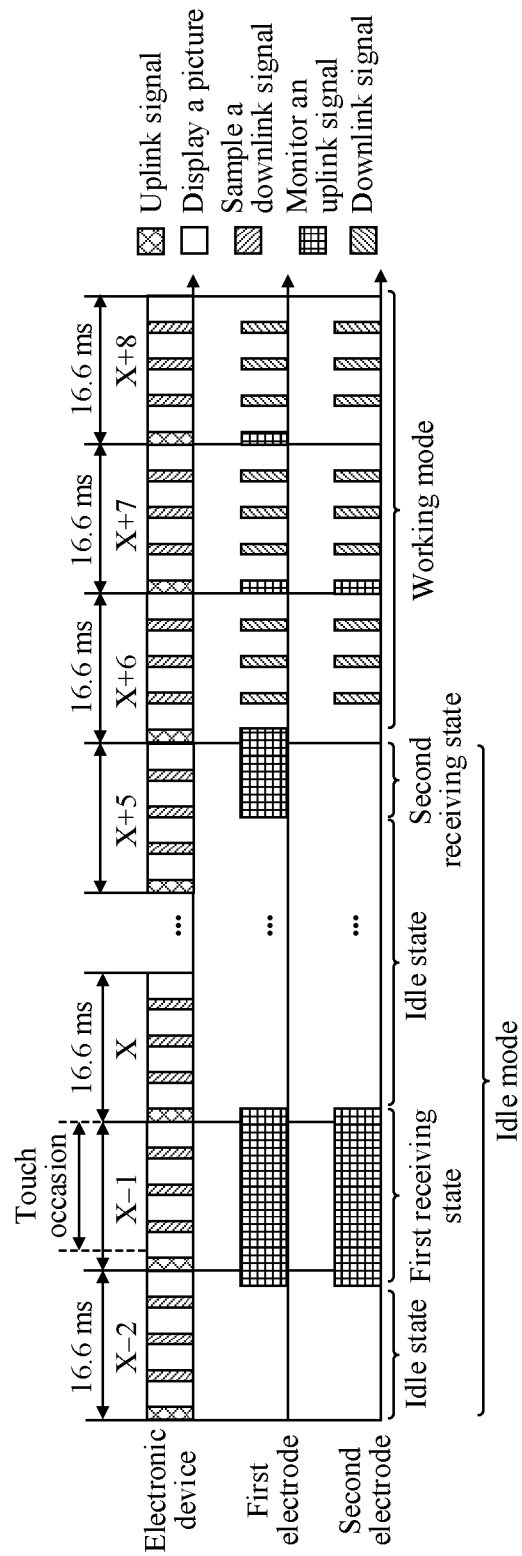
FIG. 14 is a fourth signal time sequence diagram according to an embodiment of this application.
Figure 15:
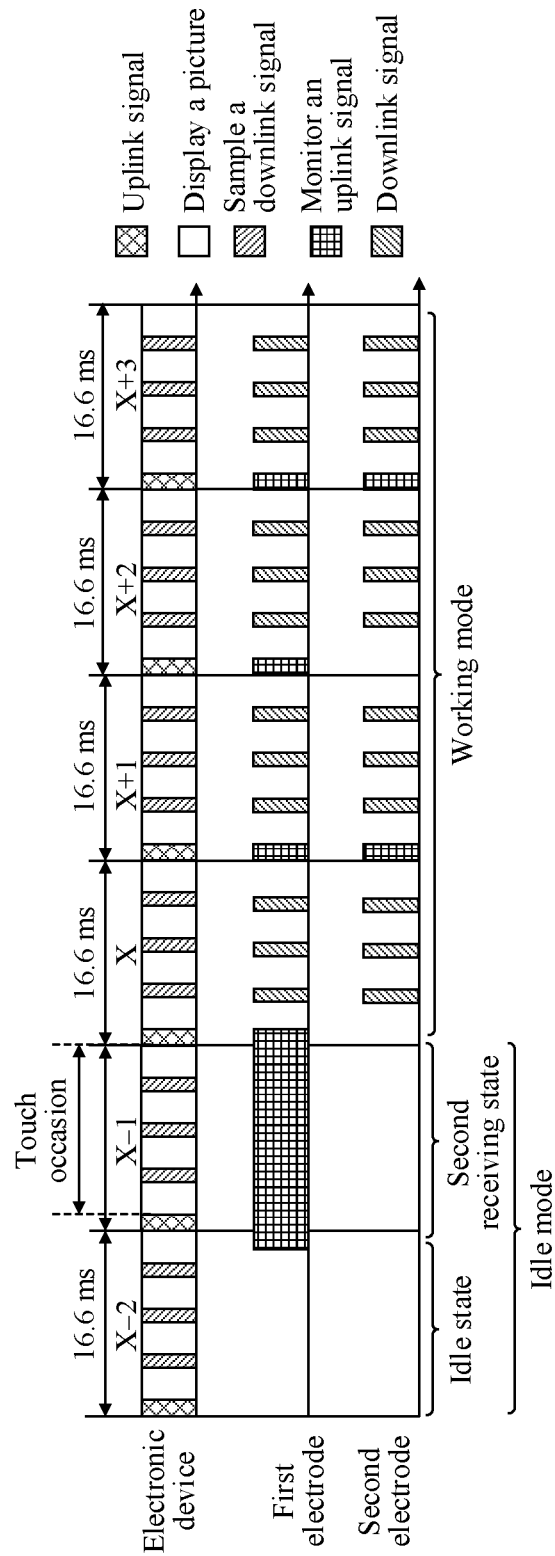
FIG. 15 is a fifth signal time sequence diagram according to an embodiment of this application.

In addition, for a detailed description of the idle mode in a signal time sequence diagram shown in FIG. 14, refer to the detailed description of the idle mode in the signal time sequence diagram shown in FIG. 11; and for a detailed description of the idle mode in a signal time sequence diagram shown in FIG. 15, refer to the detailed description of the idle mode in the signal time sequence diagram shown in FIG. 12.

Step 1303: The control module receives, when the stylus is in the working mode, an $N^{th}$ frame of uplink signal sent by an electronic device based on a target receiving channel that is turned on.

In some embodiments, when the stylus is in the working mode, a control unit may control on or off of a first switch S1 and a second switch S2, to control a target receiving channel to be turned on, and receive the $N^{th}$ frame of uplink signal sent by the electronic device based on the target receiving channel that is turned on.

In a case, the target receiving channel for receiving and corresponding to the $N^{th}$ frame of uplink signal includes the first receiving channel and the second receiving channel. In this case, the control unit may control both the first switch S1 and the second switch S2 to be turned on; and a first electrode and a second electrode simultaneously receive the $N^{th}$ frame of uplink signal sent by the electronic device, and transmit the uplink signal to the control module based on the first receiving channel and the second receiving channel.

In another case, the target receiving channel for receiving and corresponding to the $N^{th}$ frame of uplink signal is the first receiving channel. In this case, the control unit may control the first switch S1 to be turned on and the second switch S2 to be turned off; and the first electrode receives the $N^{th}$ frame of uplink signal sent by the electronic device, and transmits the uplink signal to the control module based on the first receiving channel.

Step 1304: The control module decodes the $N^{th}$ frame of uplink signal.

An execution process of step 1304 is similar to an execution process of step 904. To avoid repetitions, details are not described herein again. When the decoding of the $N^{th}$ frame of uplink signal succeeds, step 1305 is performed. When the decoding of the $N^{th}$ frame of uplink signal fails, step 1306 and step 1307 are performed.

Step 1305: The control module controls, if a decoding result of the $N^{th}$ frame of uplink signal is that the decoding succeeds, the first electrode and the second electrode to send a downlink signal based on the decoded $N^{th}$ frame of uplink signal.

For a specific execution process of step 1305, refer to an execution process of controlling the first electrode and the second electrode to send the downlink signal in step 905.

In a case, as shown in FIG. 14, if the $N^{th}$ frame of uplink signal sent by the electronic device is an $(X+6)^{th}$ frame of uplink signal shown in FIG. 14 and a decoding unit successfully decodes the $(X+6)^{th}$ frame of uplink signal, the control unit controls the first electrode and the second electrode to sequentially send K downlink signals based on the decoded $(X+6)^{th}$ frame of uplink signal. Correspondingly, if the $N^{th}$ frame of uplink signal sent by the electronic device is an $(X+8)^{th}$ frame of uplink signal shown in FIG. 14 and the decoding unit successfully decodes the $(X+8)^{th}$ frame of uplink signal, the control unit controls the first electrode and the second electrode to sequentially send K downlink signals based on the decoded $(X+8)^{th}$ frame of uplink signal.

In another case, as shown in FIG. 15, if the $N^{th}$ frame of uplink signal sent by the electronic device is an $X^{th}$ frame of uplink signal shown in FIG. 15 and the decoding unit successfully decodes the $X^{th}$ frame of uplink signal, the control unit controls the first electrode and the second electrode to sequentially send K downlink signals based on the decoded $X^{th}$ frame of uplink signal. Correspondingly, if the $N^{th}$ frame of uplink signal sent by the electronic device is an $(X+2)^{th}$ frame of uplink signal shown in FIG. 15 and the decoding unit successfully decodes the $(X+2)^{th}$ frame of uplink signal, the control unit controls the first electrode and the second electrode to sequentially send K downlink signals based on the decoded $(X+2)^{th}$ frame of uplink signal.

Step 1306: The control module determines, if a decoding result of the $N^{th}$ frame of uplink signal is that the decoding fails, whether a successfully decoded target uplink signal exists in M frames of uplink signals before the $N^{th}$ frame of uplink signal.

For a specific execution process of step 1306, refer to an execution process of determining whether a successfully decoded target uplink signal exists in the M frames of uplink signals before the $N^{th}$ frame of uplink signal in step 906.

Step 1307: The control module controls, if a successfully decoded target uplink signal exists, the first electrode and the second electrode to send a downlink signal based on the target uplink signal.

In a case, as shown in FIG. 14, it is assumed that the $N^{th}$ frame of uplink signal sent by the electronic device is an $(X+7)^{th}$ frame of uplink signal shown in FIG. 14, decoding of the $(X+7)^{th}$ frame of uplink signal by the decoding unit fails, and the control unit determines that an $(X+6)^{th}$ frame of uplink signal before the $(X+7)^{th}$ frame of uplink signal is successfully decoded. In this case, the $(X+6)^{th}$ frame of uplink signal is used as a target uplink signal, and the control unit controls the first electrode and the second electrode to sequentially send K downlink signals based on the decoded $(X+6)^{th}$ frame of uplink signal.

In another case, as shown in FIG. 15, it is assumed that the $N^{th}$ frame of uplink signal sent by the electronic device is an $(X+1)^{th}$ frame of uplink signal shown in FIG. 15, decoding of the $(X+1)^{th}$ frame of uplink signal by the decoding unit fails, and the control unit determines that an $X^{th}$ frame of uplink signal before the $(X+1)^{th}$ frame of uplink signal is successfully decoded. In this case, the $X^{th}$ frame of uplink signal is used as a target uplink signal, and the control unit controls the first electrode and the second electrode to sequentially send K downlink signals based on the decoded $X^{th}$ frame of uplink signal. Correspondingly, it is assumed that the $N^{th}$ frame of uplink signal sent by the electronic device is an $(X+3)^{th}$ frame of uplink signal shown in FIG. 15, decoding of the $(X+3)^{th}$ frame of uplink signal by the decoding unit fails, and the control unit determines that the $X^{th}$ frame of uplink signal and an $(X+2)^{th}$ frame of uplink signal before the $(X+3)^{th}$ frame of uplink signal each are successfully decoded. In this case, the $X^{th}$ frame of uplink signal and the $(X+2)^{th}$ frame of uplink signal are used as target uplink signals, and the control unit controls the first electrode and the second electrode to sequentially send K downlink signals based on the decoded $X^{th}$ frame of uplink signal or $(X+2)^{th}$ frame of uplink signal.

Step 1308: The control module alternately controls, based on channel configuration information corresponding to the $N^{th}$ frame of uplink signal, a first preset channel and a second preset channel to be turned on, to receive an $(N+1)^{th}$ frame of uplink signal sent by the electronic device based on the target receiving channel that is turned on.

In some embodiments, after the $N^{th}$ frame of uplink signal is decoded, the decoding unit does not need to rely on the decoding result of the $N^{th}$ frame of uplink signal, but directly determines, based on the channel configuration information of the target receiving channel of the $N^{th}$ frame of uplink signal, a target receiving channel for receiving the $(N+1)^{th}$ frame of uplink signal.

The channel configuration information corresponding to the $N^{th}$ frame of uplink signal is turning on information of the target receiving channel for receiving the $N^{th}$ frame of uplink signal. After the $N^{th}$ frame of uplink signal is decoded, the decoding unit switches the target receiving channel for receiving the $N^{th}$ frame of uplink signal to the target receiving channel for receiving the $(N+1)^{th}$ frame of uplink signal. The target receiving channel for receiving the $N^{th}$ frame of uplink signal is different from the target receiving channel for receiving the $(N+1)^{th}$ frame of uplink signal.

In a case, the target receiving channel for receiving the $N^{th}$ frame of uplink signal includes the first receiving channel and the second receiving channel. In this case, the target receiving channel for receiving the $(N+1)^{th}$ frame of uplink signal is the first receiving channel (in other words, the second receiving channel in this case is turned off).

In another case, the target receiving channel for receiving the $N^{th}$ frame of uplink signal is the first receiving channel (in other words, the second receiving channel in this case is turned off). In this case, the target receiving channel for receiving the $(N+1)^{th}$ frame of uplink signal includes the first receiving channel and the second receiving channel.

As shown in FIG. 14, if the $N^{th}$ frame of uplink signal sent by the electronic device is the $(X+6)^{th}$ frame of uplink signal shown in FIG. 14, and a target receiving channel corresponding to the $(X+6)^{th}$ frame of uplink signal is the first receiving channel, the $(N+1)^{th}$ frame of uplink signal is the $(X+7)^{th}$ frame of uplink signal shown in FIG. 14, and a target receiving channel corresponding to the $(X+7)^{th}$ frame of uplink signal includes the first receiving channel and the second receiving channel. If the $N^{th}$ frame of uplink signal sent by the electronic device is the $(X+7)^{th}$ frame of uplink signal shown in FIG. 14, and the target receiving channel corresponding to the $(X+7)^{th}$ frame of uplink signal includes the first receiving channel and the second receiving channel, the $(X+1)^{th}$ frame of uplink signal is the $(X+8)^{th}$ frame of uplink signal in FIG. 14, and a target receiving channel corresponding to the $(X+8)^{th}$ frame of uplink signal is the first receiving channel.

As shown in FIG. 15, if the $N^{th}$ frame of uplink signal sent by the electronic device is the $X^{th}$ frame of uplink signal shown in FIG. 15, and a target receiving channel corresponding to the $X^{th}$ frame of uplink signal is the first receiving channel, the $(N+1)^{th}$ frame of uplink signal is the $(X+1)^{th}$ frame of uplink signal shown in FIG. 15, and a target receiving channel corresponding to the $(X+1)^{th}$ frame of uplink signal includes the first receiving channel and the second receiving channel. If the $N^{th}$ frame of uplink signal sent by the electronic device is the $(X+1)^{th}$ frame of uplink signal shown in FIG. 15, and the target receiving channel corresponding to the $(X+1)^{th}$ frame of uplink signal includes the first receiving channel and the second receiving channel, the $(X+1)^{th}$ frame of uplink signal is the $(X+2)^{th}$ frame of uplink signal in FIG. 15, and a target receiving channel corresponding to the $(X+2)^{th}$ frame of uplink signal is the first receiving channel. If the $N^{th}$ frame of uplink signal sent by the electronic device is the $(X+2)^{th}$ frame of uplink signal shown in FIG. 15, and the target receiving channel corresponding to the $(X+2)^{th}$ frame of uplink signal is the first receiving channel, the $(N+1)^{th}$ frame of uplink signal is the $(X+3)^{th}$ frame of uplink signal shown in FIG. 15, and a target receiving channel corresponding to the $(X+3)^{th}$ frame of uplink signal includes the first receiving channel and the second receiving channel.

The first receiving channel and the second receiving channel are collectively referred to as the first preset channel, and the first receiving channel is referred to as the second preset channel. Therefore, when the stylus is in the working mode, in this embodiment of this application, the first preset channel and the second preset channel may be controlled to be alternately turned on, to receive an uplink signal sent by the electronic device. In this case, target receiving channels for receiving two adjacent frames of uplink signals are different.

It should be noted that, step 1308 may be performed after step 1305 or step 1307. Alternatively, after the $N^{th}$ frame of uplink is decoded in step 1304, step 1308 may be performed first, and then step 1305 or step 1306 may be performed. This is not limited in embodiments of this application.

Based on the foregoing manner, uplink signals are received in a polling manner by switching different electrodes, so that the uplink signals received by the control module are from the first electrode alone, or from the first electrode and the second electrode. Therefore, when an uplink signal received by the second electrode is interfered with, an uplink signal can also be normally received to be successfully decoded within a periodicity in which the first electrode works alone, to alleviate problems caused by interference, such as the stylus being unable to discharge ink, writing disconnection, and latency, thereby greatly improving writing experience.

In a third optional implementation, based on channel configuration information corresponding to an $N^{th}$ frame of uplink signal, a control module in this embodiment of this application may also cyclically control a first preset channel being turned on, the first preset channel being turned on, and a second preset channel being turned on, to receive an $(N+1)^{th}$ frame of uplink signal sent by an electronic device based on a target receiving channel that is turned on. In other words, a state corresponding to each cycle periodicity in the foregoing cycle sequence is that the first preset channel is turned on, the first preset channel is turned on, and the second preset channel is turned on. The state corresponding to each cycle periodicity is the same.

The channel configuration information corresponding to the $N^{th}$ frame of uplink signal is that the first preset channel is turned on or the second preset channel is turned on; and the first preset channel includes the first receiving channel and the second receiving channel, and the second preset channel includes the first receiving channel.

After the $N^{th}$ frame of uplink signal is decoded, a decoding unit selects, based on the channel configuration information corresponding to the $N^{th}$ frame of uplink signal and a corresponding cycle sequence, a target receiving channel for receiving the $(N+1)^{th}$ frame of uplink signal.

In a first case, a target receiving channel for receiving the $N^{th}$ frame of uplink signal includes the first receiving channel and the second receiving channel, and a state in which both the first receiving channel and the second receiving channel are turned on is a state in which both the first receiving channel and the second receiving channel are turned on for the first time in each cycle periodicity of the foregoing cycle sequence. Therefore, the target receiving channel for receiving the $(N+1)^{th}$ frame of uplink signal includes the first receiving channel and the second receiving channel.

In a second case, the target receiving channel for receiving the $N^{th}$ frame of uplink signal includes the first receiving channel and the second receiving channel, and the state in which both the first receiving channel and the second receiving channel are turned on is a state in which both the first receiving channel and the second receiving channel are turned on for the second time in each cycle periodicity of the foregoing cycle sequence. Therefore, the target receiving channel for receiving the $(N+1)^{th}$ frame of uplink signal is the first receiving channel.

In a third case, the target receiving channel for receiving the $N^{th}$ frame of uplink signal is the first receiving channel. In this case, the target receiving channel for receiving the $(N+1)^{th}$ frame of uplink signal includes the first receiving channel and the second receiving channel.

Figure 16:
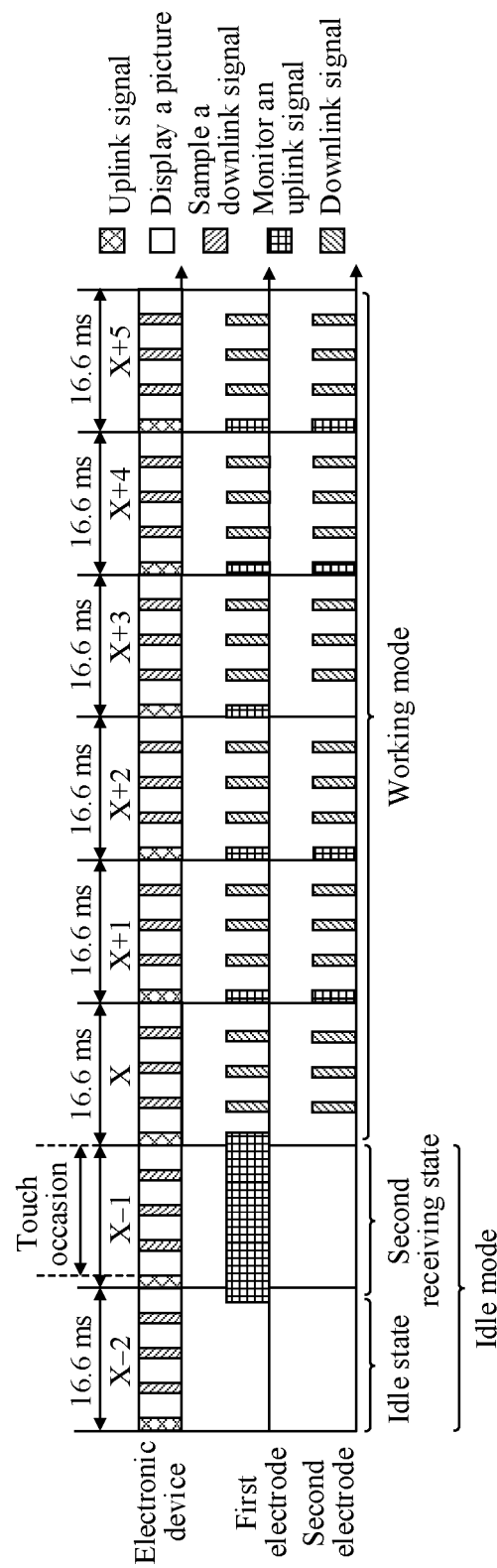
FIG. 16 is a sixth signal time sequence diagram according to an embodiment of this application.

As shown in FIG. 16, if the $N^{th}$ frame of uplink signal sent by the electronic device is an $X^{th}$ frame of uplink signal shown in FIG. 16, and a target receiving channel corresponding to the $X^{th}$ frame of uplink signal is the first receiving channel, the $(N+1)^{th}$ frame of uplink signal is an $(X+1)^{th}$ frame of uplink signal shown in FIG. 16, and a target receiving channel corresponding to the $(X+1)^{th}$ frame of uplink signal includes the first receiving channel and the second receiving channel.

It is assumed that the $N^{th}$ frame of uplink signal sent by the electronic device is the $(X+1)^{th}$ frame of uplink signal shown in FIG. 16, the target receiving channel corresponding to the $(X+1)^{th}$ frame of uplink signal includes the first receiving channel and the second receiving channel, and the state in which both the first receiving channel and the second receiving channel are turned on is a state in which both the first receiving channel and the second receiving channel are turned on for the first time in a same cycle periodicity of the foregoing cycle sequence. Therefore, the $(N+1)^{th}$ frame of uplink signal is an $(X+2)^{th}$ frame of uplink signal shown in FIG. 16, and a target receiving channel corresponding to the $(X+2)^{th}$ frame of uplink signal still includes the first receiving channel and the second receiving channel.

It is assumed that the $N^{th}$ frame of uplink signal sent by the electronic device is the $(X+2)^{th}$ frame of uplink signal shown in FIG. 16, the target receiving channel corresponding to the $(X+2)^{th}$ frame of uplink signal includes the first receiving channel and the second receiving channel, and the state in which both the first receiving channel and the second receiving channel are turned on is a state in which both the first receiving channel and the second receiving channel are turned on for the second time in the same cycle periodicity of the foregoing cycle sequence. Therefore, the $(N+1)^{th}$ frame of uplink signal is an $(X+3)^{th}$ frame of uplink signal shown in FIG. 16, and a target receiving channel corresponding to the $(X+3)^{th}$ frame of uplink signal is the first receiving channel.

If the $N^{th}$ frame of uplink signal sent by the electronic device is the $(X+3)^{th}$ frame of uplink signal shown in FIG. 16, and the target receiving channel corresponding to the $(X+3)^{th}$ frame of uplink signal is the first receiving channel, the $(N+1)^{th}$ frame of uplink signal is an $(X+4)^{th}$ frame of uplink signal shown in FIG. 16, and a target receiving channel corresponding to the $(X+4)^{th}$ frame of uplink signal includes the first receiving channel and the second receiving channel.

It is assumed that the $N^{th}$ frame of uplink signal sent by the electronic device is the $(X+4)^{th}$ frame of uplink signal shown in FIG. 16, the target receiving channel corresponding to the $(X+4)^{th}$ frame of uplink signal includes the first receiving channel and the second receiving channel, and the state in which both the first receiving channel and the second receiving channel are turned on is a state in which both the first receiving channel and the second receiving channel are turned on for the first time in a same cycle periodicity of the foregoing cycle sequence. Therefore, the $(N+1)^{th}$ frame of uplink signal is an $(X+5)^{th}$ frame of uplink signal shown in FIG. 16, and a target receiving channel corresponding to the $(X+5)^{th}$ frame of uplink signal still includes the first receiving channel and the second receiving channel.

Based on the foregoing manner, uplink signals are received in a polling manner by cyclically switching different electrodes, so that the uplink signals received by the control module are from a first electrode alone, or from the first electrode and a second electrode. Therefore, when an uplink signal received by the second electrode is interfered with, an uplink signal can also be normally received to be successfully decoded within a periodicity in which the first electrode works alone, to alleviate problems caused by interference, such as a stylus being unable to discharge ink, writing disconnection, and latency, thereby greatly improving writing experience.

It should be noted that, for a detailed description of an idle mode in a signal time sequence diagram shown in FIG. 16, refer to the detailed description of the idle mode in the signal time sequence diagram shown in FIG. 12. The control module cyclically controls, when the stylus is in the idle mode, on or off of the first receiving channel and the second receiving channel based on the following second preset sequence. The second preset sequence is that both the first receiving channel and the second receiving channel are turned off, both the first receiving channel and the second receiving channel are turned on, both the first receiving channel and the second receiving channel are turned off, and the first receiving channel is turned on and the second receiving channel is turned off.

In a fourth optional implementation, based on channel configuration information corresponding to an $N^{th}$ frame of uplink signal, a control module in this embodiment of this application may also cyclically control a first preset channel being turned on, a second preset channel being turned on, and a third preset channel being turned on, to receive an $(N+1)^{th}$ frame of uplink signal sent by an electronic device based on a target receiving channel that is turned on.

The channel configuration information corresponding to the $N^{th}$ frame of uplink signal is one of that the first preset channel is turned on, that the second preset channel is turned on, and that the third preset channel is turned on. The first preset channel includes a first receiving channel and a second receiving channel, the second preset channel includes the first receiving channel (in this case, the second receiving channel is turned off), and the third preset channel includes the second receiving channel (in this case, the first receiving channel is turned off).

After the $N^{th}$ frame of uplink signal is decoded, a decoding unit selects, based on the channel configuration information corresponding to the $N^{th}$ frame of uplink signal and a corresponding cycle sequence, a target receiving channel for receiving the $(N+1)^{th}$ frame of uplink signal.

In a first case, a target receiving channel for receiving the $N^{th}$ frame of uplink signal includes the first receiving channel and the second receiving channel. In this case, the target receiving channel for receiving the $(N+1)^{th}$ frame of uplink signal is the first receiving channel.

In a second case, the target receiving channel for receiving the $N^{th}$ frame of uplink signal is the first receiving channel. In this case, the target receiving channel for receiving the $(N+1)^{th}$ frame of uplink signal is the second receiving channel.

In a third case, the target receiving channel for receiving the $N^{th}$ frame of uplink signal is the second receiving channel. In this case, the target receiving channel for receiving the $(N+1)^{th}$ frame of uplink signal includes the first receiving channel and the second receiving channel.

Figure 17:
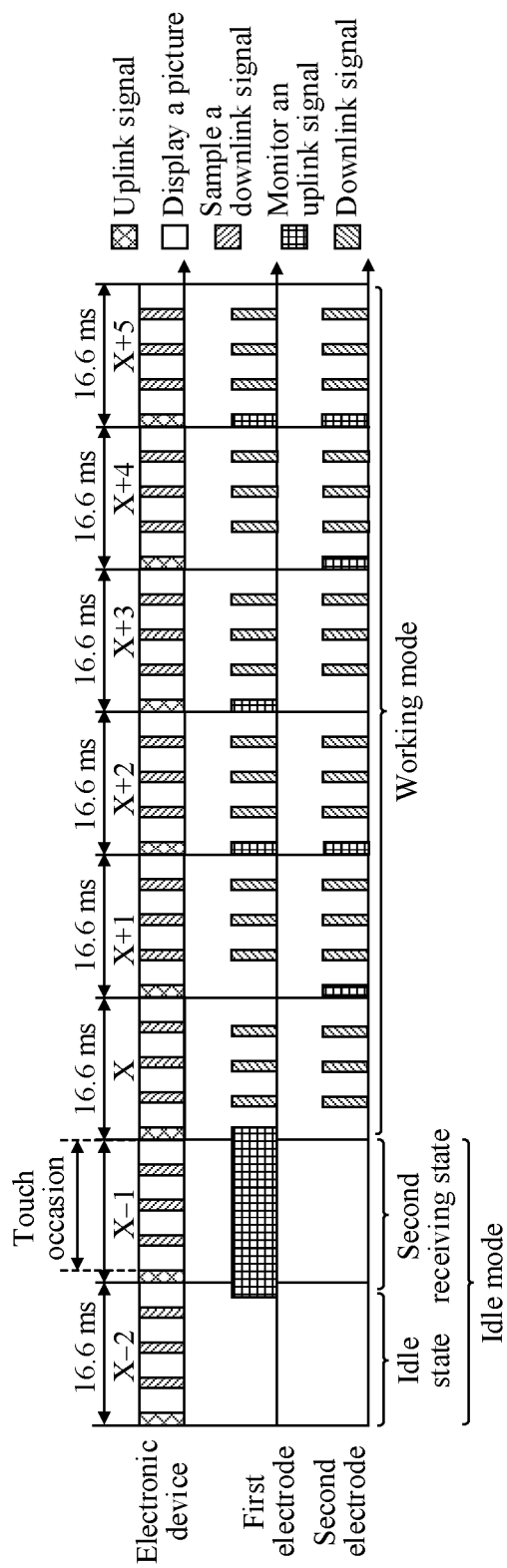
FIG. 17 is a seventh signal time sequence diagram according to an embodiment of this application.

As shown in FIG. 17, if the $N^{th}$ frame of uplink signal sent by the electronic device is an $X^{th}$ frame of uplink signal shown in FIG. 17, and a target receiving channel corresponding to the $X^{th}$ frame of uplink signal is the first receiving channel, the $(N+1)^{th}$ frame of uplink signal is an $(X+1)^{th}$ frame of uplink signal shown in FIG. 17, and a target receiving channel corresponding to the $(X+1)^{th}$ frame of uplink signal is the second receiving channel.

If the $N^{th}$ frame of uplink signal sent by the electronic device is the $(X+1)^{th}$ frame of uplink signal shown in FIG. 17, and the target receiving channel corresponding to the $(X+1)^{th}$ frame of uplink signal is the second receiving channel, the $(N+1)^{th}$ frame of uplink signal is an $(X+2)^{th}$ frame of uplink signal shown in FIG. 17, and a target receiving channel corresponding to the $(X+2)^{th}$ frame of uplink signal includes the first receiving channel and the second receiving channel.

If the $N^{th}$ frame of uplink signal sent by the electronic device is the $(X+2)^{th}$ frame of uplink signal shown in FIG. 17, and the target receiving channel corresponding to the $(X+2)^{th}$ frame of uplink signal includes the first receiving channel and the second receiving channel, the $(N+1)^{th}$ frame of uplink signal is an $(X+3)^{th}$ frame of uplink signal in FIG. 17, and a target receiving channel corresponding to the $(X+3)^{th}$ frame of uplink signal is the first receiving channel.

If the $N^{th}$ frame of uplink signal sent by the electronic device is the $(X+3)^{th}$ frame of uplink signal shown in FIG. 17, and the target receiving channel corresponding to the $(X+3)^{th}$ frame of uplink signal is the first receiving channel, the $(N+1)^{th}$ frame of uplink signal is an $(X+4)^{th}$ frame of uplink signal shown in FIG. 17, and a target receiving channel corresponding to the $(X+4)^{th}$ frame of uplink signal is the second receiving channel.

If the $N^{th}$ frame of uplink signal sent by the electronic device is the $(X+4)^{th}$ frame of uplink signal shown in FIG. 17, and the target receiving channel corresponding to the $(X+4)^{th}$ frame of uplink signal is the second receiving channel, the $(N+1)^{th}$ frame of uplink signal is an $(X+5)^{th}$ frame of uplink signal shown in FIG. 17, and a target receiving channel corresponding to the $(X+5)^{th}$ frame of uplink signal includes the first receiving channel and the second receiving channel.

Based on the foregoing manner, uplink signals are received in a polling manner by cyclically switching different electrodes, so that the uplink signals received by the control module are from a first electrode alone, or from a second electrode alone, or from the first electrode and the second electrode. Therefore, when an uplink signal received by the second electrode is interfered with, an uplink signal can also be normally received to be successfully decoded within a periodicity in which the first electrode works alone; or when an uplink signal received by the first electrode is interfered with, an uplink signal can also be normally received to be successfully decoded within a periodicity in which the second electrode works alone, to alleviate problems caused by interference, such as a stylus being unable to discharge ink, writing disconnection, and latency, thereby greatly improving writing experience.

It should be noted that, for a detailed description of an idle mode in a signal time sequence diagram shown in FIG. 17, refer to the detailed description of the idle mode in the signal time sequence diagram shown in FIG. 12.

It may be understood that, in embodiments of this application, based on the channel configuration information corresponding to the $N^{th}$ frame of uplink signal, a first preset sequence for cyclically controlling target receiving channels that are turned on is not limited to the three cycling manners shown in FIG. 15 to FIG. 17. The first preset sequence may also be another cycling manner. All manners of ensuring that a target receiving channel for receiving one or more frames of uplink signals in consecutive Q frames of uplink signals is the first receiving channel are applicable to this application, where Q is a positive integer greater than 1.

For example, the first preset sequence may also be a manner of cyclically controlling the first preset channel being turned on, the second preset channel being turned on, and the second preset channel being turned on. The first preset channel includes the first receiving channel and the second receiving channel, and the second preset channel is the first receiving channel.

Certainly, when the stylus is in the idle mode, on or off of the first receiving channel and the second receiving channel may also be cyclically controlled based on the following second preset sequence. The second preset sequence may also be that both the first receiving channel and the second receiving channel are turned off, both the first receiving channel and the second receiving channel are turned on, both the first receiving channel and the second receiving channel are turned off, the first receiving channel is turned on and the second receiving channel is turned off, both the first receiving channel and the second receiving channel are turned off, and the first receiving channel is turned off and the second receiving channel is turned on.

In the foregoing embodiments, an example in which the first electrode is used as both an emitter electrode and a receiving electrode, and the second electrode is used as both an emitter electrode and a receiving electrode is used for description. Certainly, it may be understood that, in embodiments of this application, one electrode of the first electrode and the second electrode may be used as only a receiving electrode, and the other electrode is used as both an emitter electrode and a receiving electrode. Alternatively, in embodiments of this application, the first electrode and the second electrode may be used as only a receiving electrode. In this case, a third electrode and a fourth electrode are further arranged in the stylus, and the third electrode and the fourth electrode are used as only an emitter electrode. The first electrode, the second electrode, the third electrode, and the fourth electrode each are not the same electrode.

In addition, an embodiment of this application further provides a stylus shown in FIG. 5. The stylus includes a memory (not shown in FIG. 5) and a processor, where the memory is configured to store a computer program, and the processor of the stylus may read the computer program stored in the memory, to perform steps performed in the foregoing method embodiments. Implementation principles and technical effects thereof are similar. Details are not described herein again.

An embodiment of this application further provides a touch system. The touch system includes the stylus shown in FIG. 5 and the electronic device shown in FIG. 6. The stylus may perform steps performed by the stylus in the foregoing method embodiments. The electronic device is configured to send an uplink signal to the stylus and sample a downlink signal sent by the stylus, to achieve signal synchronization between the electronic device and the stylus.

An embodiment of this application further provides a computer-readable storage medium. All or some of methods in the foregoing embodiments may be implemented by using software, hardware, firmware, or any combination thereof. If implemented in software, the functions may be stored on or transmitted over as one or more instructions or code on a computer-readable medium or a computer-readable medium. The computer-readable medium may include a computer storage medium and a communication medium, and may further include any medium that can transmit a computer program from one place to another. The storage medium may be any target medium accessible by a computer.

In a possible implementation, the computer-readable medium may include a RAM, a ROM, a compact disc read-only memory (compact disc read-only memory, CD-ROM) or another optical disk memory, a magnetic disk memory or another magnetic storage device, or any other medium that is to carry or store required program code in a form of an instruction or a data structure, and may be accessed by a computer. Any connection line may also be appropriately referred to as a computer-readable medium. For example, if software is transmitted from a website, a server or another remote source by using a coaxial cable, an optical fiber cable, a twisted pair, a digital subscriber line (digital subscriber line, DSL) or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used in this specification include an optical disc, a laser disc, an optical disc, a digital versatile disc (digital versatile disc, DVD), a floppy disk, and a blue ray disc, where the magnetic disk generally reproduces data in a magnetic manner, and the optical disc reproduces data optically by using laser. The foregoing combination should also be included in the scope of the computer-readable medium.

"Plurality of" in this specification means two or more. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In formulas, the character "/" indicates a "division" relationship between the associated objects.

It may be understood that, various reference numerals in embodiments of this application are merely for differentiation for ease of description, and are not intended to limit the scope of embodiments of this application.

It may be understood that, in embodiments of this application, an order of sequence numbers of the foregoing processes does not indicate an execution sequence, and execution sequences of the processes should be determined according to functions and internal logics thereof and should not impose any limitation on an implementation process of embodiments of this application.

The invention claimed is:

1. A method, comprising:
obtaining, when a stylus is in a working mode, an $N^{th}$ frame of an uplink signal from an electronic device; and
controlling, based on status information of the $N^{th}$ frame of the uplink signal, a target receiving channel to be turned on in a preset manner to receive an $(N+1)^{th}$ frame of the uplink signal from the electronic device based on the target receiving channel,
wherein a first receiving channel is formed between a first electrode and a control module of the stylus, a second receiving channel is formed between a second electrode and the control module, and the target receiving channel comprises the first receiving channel and/or the second receiving channel,
wherein the status information of the $N^{th}$ frame of the uplink signal comprises channel configuration information of the target receiving channel for receiving the $N^{th}$ frame of the uplink signal, and a decoding result of the $N^{th}$ frame of the uplink signal,
wherein controlling the target receiving channel to be turned on in the preset manner comprises:
continuously controlling, in a first case if the decoding result of the $N^{th}$ frame of the uplink signal is that the decoding succeeds and the channel configuration information is that a first target receiving channel is turned on, the first target receiving channel to be turned on, wherein in the first case, the first target receiving channel is a first preset channel or a second preset channel, the first preset channel comprises the first receiving channel and the second receiving channel, and the second preset channel comprises the first receiving channel; and
switching, in a second case if the decoding result of the $N^{th}$ frame of the uplink signal is that the decoding fails and the channel configuration information is that the first target receiving channel is turned on, the first target receiving channel being turned on to a second target receiving channel being turned on, wherein in the second case, one of the first target receiving channel and the second target receiving channel is the first preset channel, and another of the first and second target receiving channels is the second preset channel, the first preset channel comprises the first receiving channel and the second receiving channel, and the second preset channel comprises the first receiving channel.

2. The method of claim 1, wherein the status information of the $N^{th}$ frame of the uplink signal comprises channel configuration information of the target receiving channel for receiving the $N^{th}$ frame of the uplink signal.

3. The method of claim 2, wherein controlling the target receiving channel to be turned on in the preset manner comprises cyclically controlling an on or off status of the first receiving channel and the second receiving channel based on the channel configuration information corresponding to the $N^{th}$ frame of the uplink signal and a first preset sequence.

4. The method of claim 3, wherein the first preset sequence comprises alternately turning on the first preset channel and the second preset channel, wherein the channel configuration information corresponding to the $N^{th}$ frame of the uplink signal indicates whether the first preset channel is turned on or the second preset channel is turned on, and wherein the first preset channel comprises the first receiving channel and the second receiving channel, and the second preset channel comprises the first receiving channel.

5. The method of claim 3, wherein the first preset sequence comprises cyclically controlling the first preset channel to be turned on, the first preset channel to be again turned on, and the second preset channel to be turned on, wherein the channel configuration information corresponding to the $N^{th}$ frame of the uplink signal indicates whether the first preset channel is turned on or the second preset channel is turned on, and wherein the first preset channel comprises the first receiving channel and the second receiving channel, and the second preset channel comprises the first receiving channel.

6. The method of claim 3, wherein the first preset sequence comprises cyclically controlling the first preset channel to be turned on, the second preset channel to be turned on, and a third preset channel to be turned on are cyclically controlled, wherein the channel configuration information corresponding to the $N^{th}$ frame of the uplink signal indicates one of the first preset channel being turned on, the second preset channel being turned on, and the third preset channel being turned on, and wherein the first preset channel comprises the first receiving channel and the second receiving channel, the second preset channel comprises the first receiving channel, and the third preset channel comprises the second receiving channel.

7. The method of claim 1, wherein after obtaining the $N^{th}$ frame of the uplink signal, the method further comprises:
decoding the $N^{th}$ frame of the uplink signal; and
either a) controlling, if a result of decoding the $N^{th}$ frame of the uplink signal is that the decoding succeeds, the first electrode, the second electrode, or the first and second electrodes to send a downlink signal based on the decoded $N^{th}$ frame of the uplink signal; or
b) controlling, if the decoding fails and a successfully decoded target uplink signal exists in M frames of uplink signals before the $N^{th}$ frame of the uplink signal, the first electrode, the second electrode, or the first and second electrodes to send a downlink signal based on the target uplink signal, wherein M is a positive integer.

8. The method of claim 7, wherein controlling the first electrode, the second electrode, or the first and second electrodes to send the downlink signal based on the target uplink signal comprises controlling, if a plurality of successfully decoded target uplink signals exist, the first electrode, the second electrode, or the first and second electrodes to send the downlink signal based on a target uplink signal closest to the $N^{th}$ frame of the uplink signal.

9. The method of claim 1, wherein the stylus further comprises:
a first switch connected between the first electrode and the control module; and
a second switch connected between the second electrode and the control module,
wherein controlling, based on status information of the $N^{th}$ frame of the uplink signal, the target receiving channel to be turned on in the preset manner comprises controlling an on or off status of the first switch and the second switch in the preset manner to control an on or off status of the first receiving channel and the second receiving channel.

10. The method of claim 1, further comprising cyclically controlling, when the stylus is in an idle mode, an on or off status of the first receiving channel and the second receiving channel based on a second preset sequence, wherein the second preset sequence is that both the first receiving channel and the second receiving channel are turned off, both the first receiving channel and the second receiving channel are turned on, both the first receiving channel and the second receiving channel are turned off, and the first receiving channel is turned on and the second receiving channel is turned off.

11. The method of claim 10, further comprising controlling, if the control module successfully decodes a received uplink signal for a first time when the stylus is in the idle mode, the stylus to be switched from the idle mode to the working mode.

12. The method of claim 10, further comprising controlling, if the control module unsuccessfully decodes all received uplink signals within a preset duration or does not receive any uplink signal within the preset duration when the stylus is in the working mode, the stylus to be switched from the working mode to the idle mode.

13. A stylus, comprising:
one or more processors; and
a memory coupled to the one or more processors and configured to store instructions that, when executed by the one or more processors, cause the stylus to be configured to:
obtain, when the stylus is in a working mode, an $N^{th}$ frame of an uplink signal from an electronic device; and
control, based on status information of the $N^{th}$ frame of the uplink signal, a target receiving channel to be turned on in a preset manner to receive an $(N+1)^{th}$ frame of the uplink signal from the electronic device based on the target receiving channel,
wherein a first receiving channel is formed between a first electrode and a control module of the stylus, a second receiving channel is formed between a second electrode and the control module, and the target receiving channel comprises the first receiving channel and/or the second receiving channel,
wherein the status information of the $N^{th}$ frame of the uplink signal comprises channel configuration information of the target receiving channel for receiving the $N^{th}$ frame of the uplink signal, and a decoding result of the $N^{th}$ frame of the uplink signal,
wherein controlling the target receiving channel to be turned on in the preset manner comprises:
continuously controlling, in a first case if the decoding result of the $N^{th}$ frame of the uplink signal is that the decoding succeeds and the channel configuration information is that a first target receiving channel is turned on, the first target receiving channel to be turned on, wherein in the first case, the first target receiving channel is a first preset channel or a second preset channel, the first preset channel comprises the first receiving channel and the second receiving channel, and the second preset channel comprises the first receiving channel; and
switching, in a second case if the decoding result of the $N^{th}$ frame of the uplink signal is that the decoding fails and the channel configuration information is that the first target receiving channel is turned on, the first target receiving channel being turned on to a second target receiving channel being turned on, wherein in the second case, one of the first target receiving channel and the second target receiving channel is the first preset channel, and another of the first and second target receiving channels is the second preset channel, the first preset channel comprises the first receiving channel and the second receiving channel, and the second preset channel comprises the first receiving channel.

14. A non-transitory computer-readable storage medium storing a instructions that, when executed by one or more processors of a stylus, cause the stylus to be configured to:
obtain, when the stylus is in a working mode, an $N^{th}$ frame of an uplink signal from an electronic device; and
control, based on status information of the $N^{th}$ frame o signal, a target receiving channel to be turned on in a preset manner to receive an $(N+1)^{th}$ frame of the uplink signal from the electronic device based on the target receiving channel,
wherein a first receiving channel is formed between a first electrode and a control module of the stylus, a second receiving channel is formed between a second electrode and the control module, and the target receiving channel comprises the first receiving channel and/or the second receiving channel,
wherein the status information of the $N^{th}$ frame of the uplink signal comprises channel configuration information of the target receiving channel for receiving the $N^{th}$ frame of the uplink signal, and a decoding result of the $N^{th}$ frame of the uplink signal,
wherein controlling the target receiving channel to be turned on in the preset manner comprises:
continuously controlling, in a first case if the decoding result of the $N^{th}$ frame of the uplink signal is that the decoding succeeds and the channel configuration information is that a first target receiving channel is turned on, the first target receiving channel to be turned on, wherein in the first case, the first target receiving channel is a first preset channel or a second preset channel, the first preset channel comprises the first receiving channel and the second receiving channel, and the second preset channel comprises the first receiving channel; and
switching, in a second case if the decoding result of the $N^{th}$ frame of the uplink signal is that the decoding fails and the channel configuration information is that the first target receiving channel is turned on, the first target receiving channel being turned on to a second target receiving channel being turned on, wherein in the second case, one of the first target receiving channel and the second target receiving channel is the first preset channel, and another of the first and second target receiving channels is the second preset channel, the first preset channel comprises the first receiving channel and the second receiving channel, and the second preset channel comprises the first receiving channel.

15. A touch system, comprising an electronic device and the stylus of claim 13, wherein the electronic device is configured to send an uplink signal to the stylus, and receive a downlink signal from the stylus.

16. A stylus, comprising:
one or more processors; and
a memory coupled to the one or more processors and configured to store instructions that, when executed by the one or more processors, cause the stylus to perform the method of claim 2.

17. A stylus, comprising:
one or more processors; and
a memory coupled to the one or more processors and configured to store instructions that, when executed by the one or more processors, cause the stylus to perform the method of claim 3.

18. The method of claim 2, wherein after obtaining the $N^{th}$ frame of the uplink signal from the electronic device, the method further comprises:
decoding the $N^{th}$ frame of the uplink signal; and
either a) controlling, if a result of decoding the $N^{th}$ frame of the uplink signal is that the decoding succeeds, the first electrode, the second electrode, or the first and second electrodes to send a downlink signal based on the decoded $N^{th}$ frame of the uplink signal; or
b) controlling, if the decoding fails and a successfully decoded target uplink signal exists in M frames of uplink signals before the $N^{th}$ frame of the uplink signal, the first electrode, the second electrode, or the first and second electrodes to send a downlink signal based on the target uplink signal, wherein M is a positive integer.

19. A touch system, comprising an electronic device and the stylus of claim 16, wherein the electronic device is configured to send an uplink signal to the stylus, and receive a downlink signal from the stylus.

20. A touch system, comprising an electronic device and the stylus of claim 17, wherein the electronic device is configured to send an uplink signal to the stylus, and receive a downlink signal from the stylus.

* * * * *

UNITED STATES PATENT AND TRADEMARK OFFICE
CERTIFICATE OF CORRECTION

| | | |
|---|---|---|
| PATENT NO. | : 12,493,375 B2 | Page 1 of 1 |
| APPLICATION NO. | : 18/708358 | |
| DATED | : December 9, 2025 | |
| INVENTOR(S) | : Wei Zhang, Beihang Zhang and Hang Li | |

It is certified that error appears in the above-identified patent and that said Letters Patent is hereby corrected as shown below:

On the Title Page

Page 2, Item (56) References Cited, U.S. Patent Documents: "2023/0259221 A1 8/2023 Conghua et al." should read "2023/0259221 A1 8/2023 Fu et al."

Signed and Sealed this
Thirteenth Day of January, 2026

John A. Squires
*Director of the United States Patent and Trademark Office*